US009516870B2

(12) United States Patent
Goosey

(10) Patent No.: US 9,516,870 B2
(45) Date of Patent: Dec. 13, 2016

(54) FISHING LURE HAVING AN INERTIALLY-ACTIVATED PIVOTABLE HOOK SYSTEM

(71) Applicant: Larry Goosey, Farmington, MO (US)

(72) Inventor: Larry Goosey, Farmington, MO (US)

( * ) Notice: Subject to any disclaimer, the term of this patent is extended or adjusted under 35 U.S.C. 154(b) by 0 days.

(21) Appl. No.: 14/945,105

(22) Filed: Nov. 18, 2015

(65) Prior Publication Data

US 2016/0073617 A1 Mar. 17, 2016

Related U.S. Application Data

(63) Continuation of application No. 13/635,830, filed as application No. PCT/US2011/030013 on Mar. 25, 2011, now Pat. No. 9,220,247.

(60) Provisional application No. 61/318,004, filed on Mar. 26, 2010.

(51) Int. Cl.
*A01K 85/02* (2006.01)
*A01K 83/02* (2006.01)
*A01K 85/01* (2006.01)
*A01K 85/12* (2006.01)
*A01K 85/16* (2006.01)
*A01K 85/18* (2006.01)
*A01K 99/00* (2006.01)

(52) U.S. Cl.
CPC .............. *A01K 85/01* (2013.01); *A01K 85/02* (2013.01); *A01K 85/12* (2013.01); *A01K 85/16* (2013.01); *A01K 85/18* (2013.01); *A01K 99/00* (2013.01)

(58) Field of Classification Search
CPC .......... A01K 83/02; A01K 85/00; A01K 85/02
See application file for complete search history.

(56) References Cited

U.S. PATENT DOCUMENTS

| | | | | |
|---|---|---|---|---|
| 1,694,697 A | * | 12/1928 | Beidatsch | A01K 85/02 43/35 |
| 2,511,138 A | | 6/1950 | Wood | |
| 2,552,730 A | | 5/1951 | Miller | |
| 2,833,078 A | | 5/1958 | Peltz | |
| 2,909,863 A | | 10/1959 | Rector et al. | |
| 3,266,185 A | * | 8/1966 | Abramson, Jr. | A01K 85/02 43/35 |
| 3,411,233 A | * | 11/1968 | Hopper | A01K 85/02 43/35 |
| 3,665,634 A | * | 5/1972 | Baud | A01K 85/16 43/35 |
| 3,739,517 A | * | 6/1973 | Schleif | A01K 85/02 43/35 |
| 3,831,307 A | | 8/1974 | Pittman | |
| 3,894,350 A | | 7/1975 | Parker | |
| 4,176,489 A | * | 12/1979 | Levstik | A01K 85/16 43/35 |
| 4,380,132 A | | 4/1983 | Atkinson | |
| 4,562,661 A | * | 1/1986 | Messinger | A01K 85/16 43/35 |
| 4,782,618 A | * | 11/1988 | Rainey | A01K 85/16 43/35 |
| 4,827,656 A | * | 5/1989 | Ohnishi | A01K 85/16 43/34 |

(Continued)

*Primary Examiner* — Christopher P Ellis
*Assistant Examiner* — Michael Wang
(74) *Attorney, Agent, or Firm* — Greenblum & Bernstein, P.L.C.

(57) ABSTRACT

A fishing lure having an inertially-activated pivotable hook system having a pivotable hook assembly.

22 Claims, 17 Drawing Sheets

(56) References Cited

U.S. PATENT DOCUMENTS

| | | | |
|---|---|---|---|
| 4,873,781 A | 10/1989 | Bates | |
| 4,893,430 A | 1/1990 | Barfield | |
| 5,010,679 A * | 4/1991 | Tischer | A01K 85/02 43/35 |
| 5,036,617 A | 8/1991 | Waldrip | |
| 5,497,581 A | 3/1996 | Williams | |
| 5,661,922 A | 9/1997 | Bonomo | |
| 5,822,911 A * | 10/1998 | Cox | A01K 85/02 43/35 |
| 6,301,822 B1 | 10/2001 | Zernov | |
| 6,574,907 B1 * | 6/2003 | Mitton | A01K 85/02 43/35 |
| 6,651,375 B2 * | 11/2003 | Parrish | A01K 85/02 43/35 |
| 6,711,848 B1 * | 3/2004 | Gammieri | A01K 85/02 43/35 |
| 6,796,080 B1 | 9/2004 | Mathews, Jr. et al. | |
| 6,862,836 B1 * | 3/2005 | Ridings | A01K 85/02 43/35 |
| 6,978,571 B1 | 12/2005 | Nemire | |
| 6,993,866 B1 | 2/2006 | Strange | |
| 7,009,098 B2 | 3/2006 | Carter | |
| 7,254,916 B2 * | 8/2007 | Mussot | A01K 85/02 43/35 |
| 7,310,906 B1 | 12/2007 | Woller | |
| 7,325,357 B2 | 2/2008 | Wiskur | |
| 7,406,796 B1 | 8/2008 | Koch | |
| 7,698,852 B1 * | 4/2010 | Cox | A01K 91/10 43/35 |
| 7,913,443 B2 | 3/2011 | Ward et al. | |
| 8,689,479 B1 * | 4/2014 | Smith | A01K 85/02 43/37 |
| 2003/0177687 A1 | 9/2003 | Parrish | |
| 2005/0034349 A1 | 2/2005 | Dugger, II | |
| 2005/0150151 A1 | 7/2005 | Wiskur | |
| 2010/0000145 A1 | 1/2010 | Leppala | |
| 2010/0107469 A1 | 5/2010 | Dunkerley et al. | |

\* cited by examiner

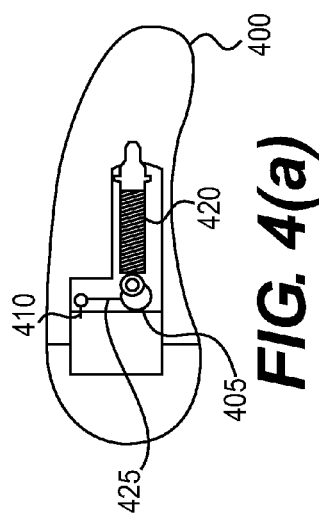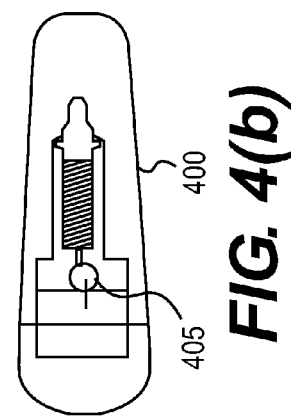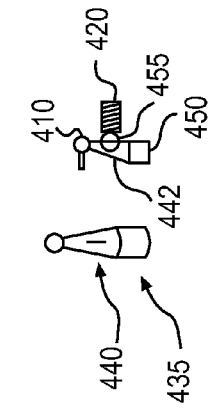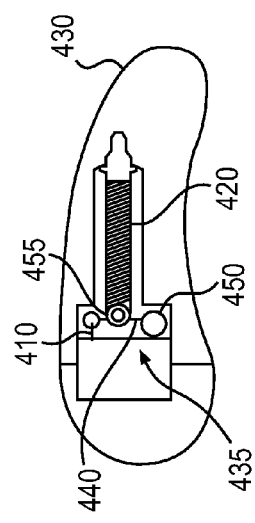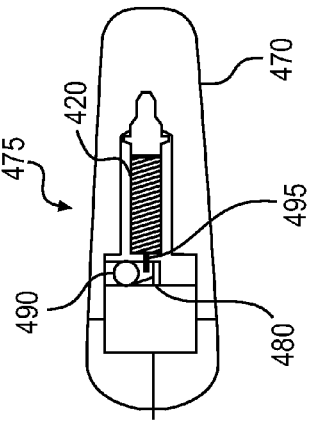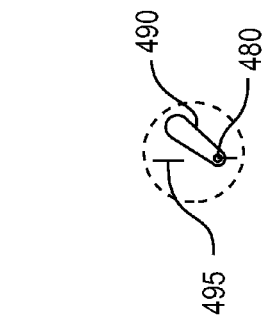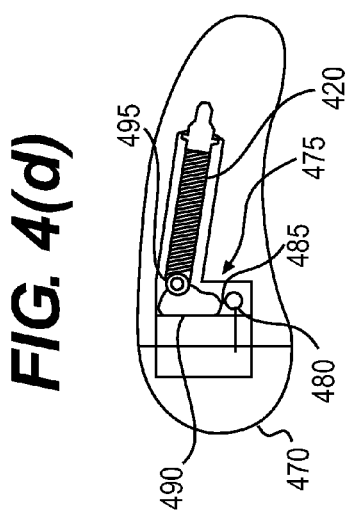

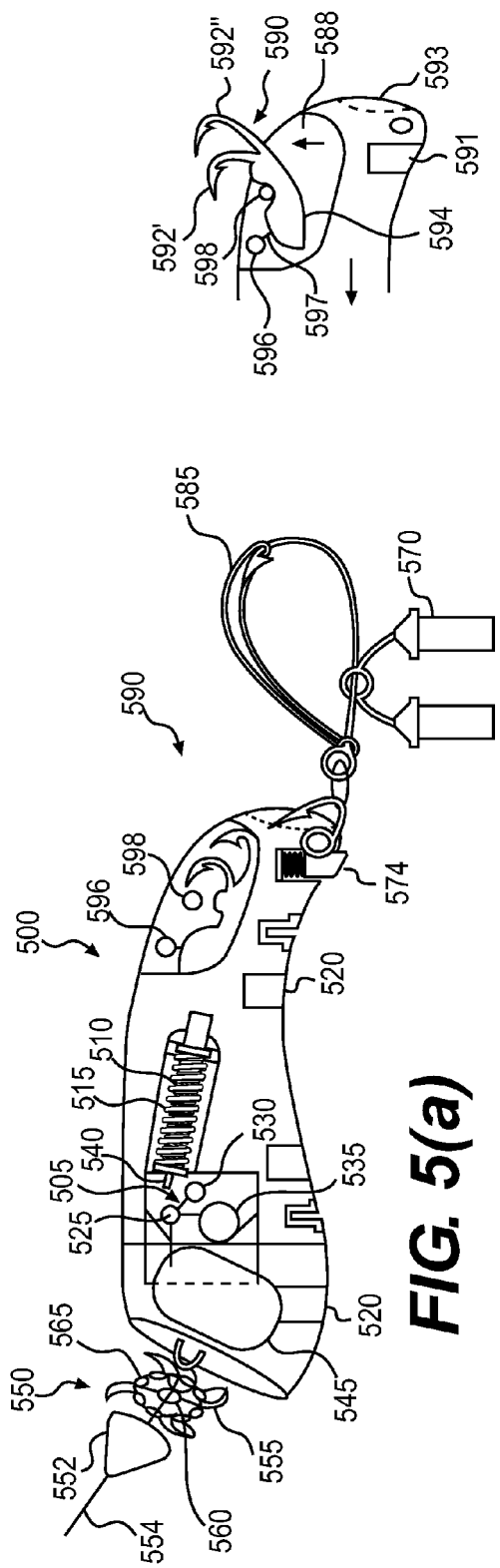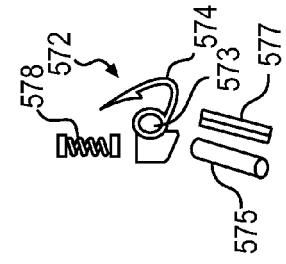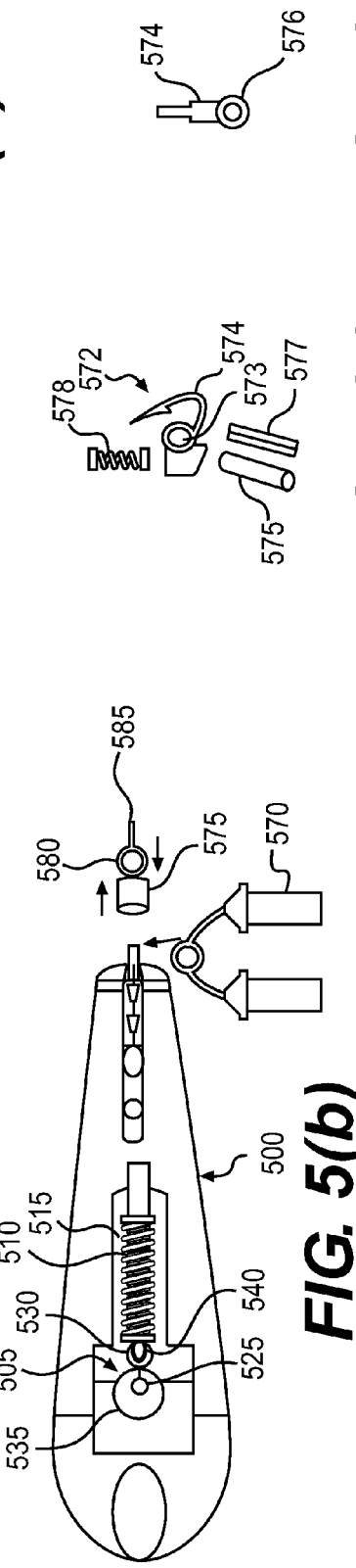

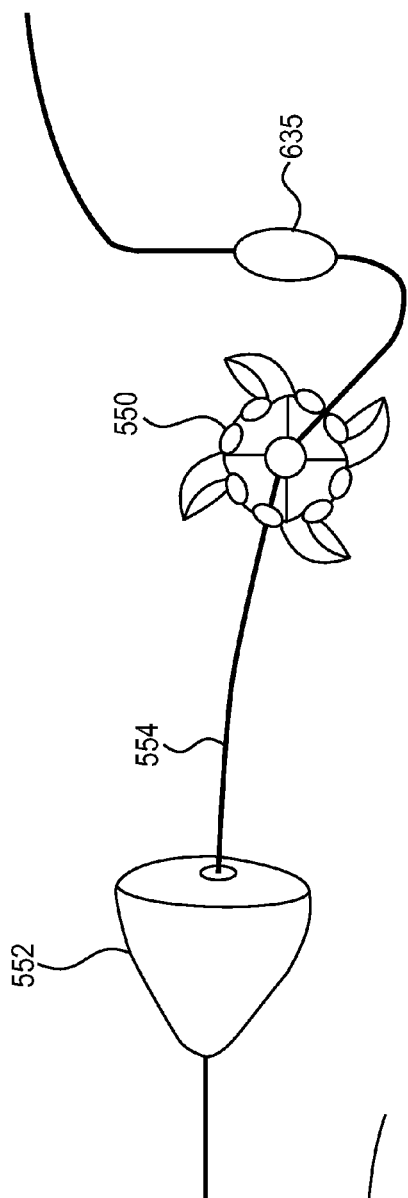
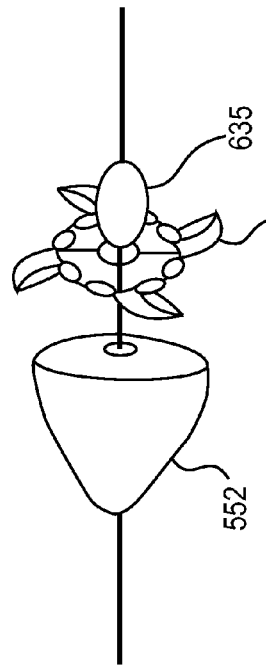
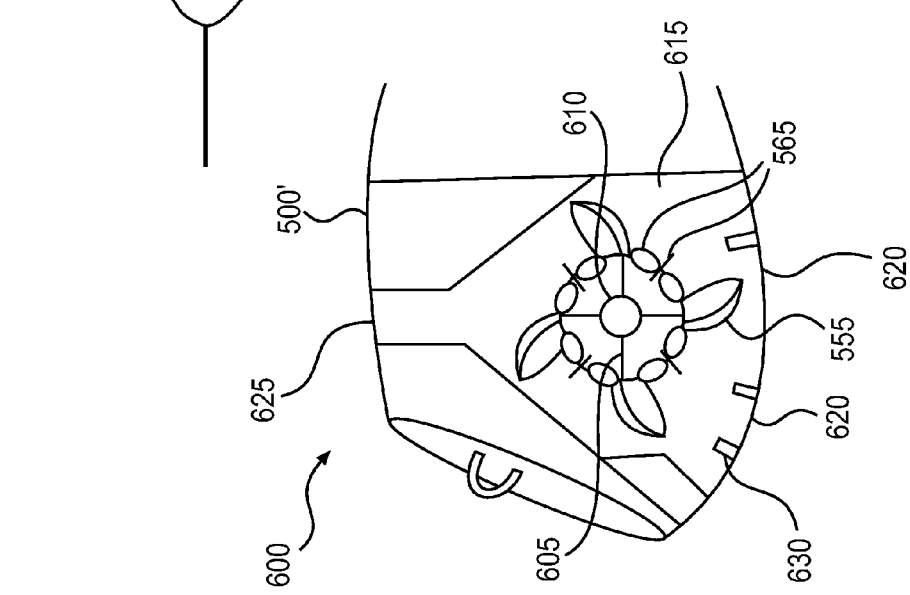
FIG. 6(b)
FIG. 6(c)
FIG. 6(a)

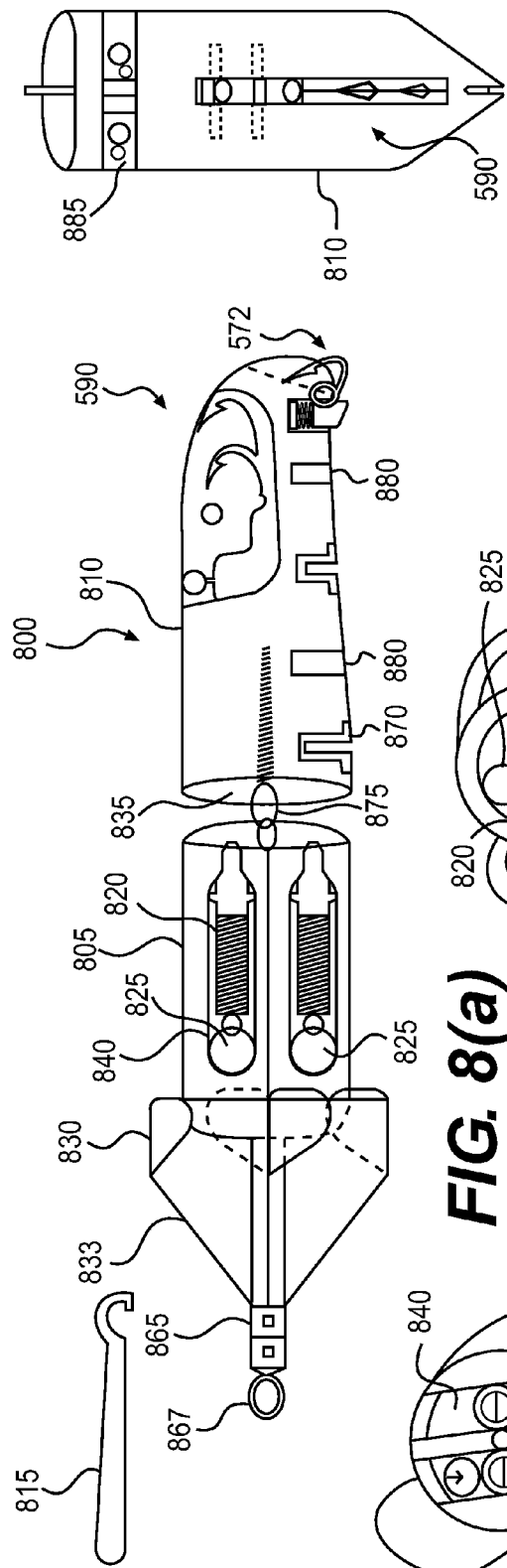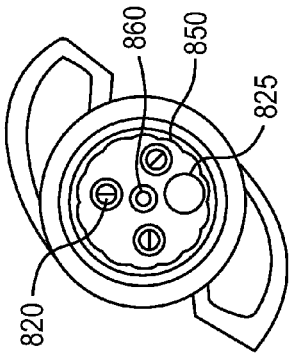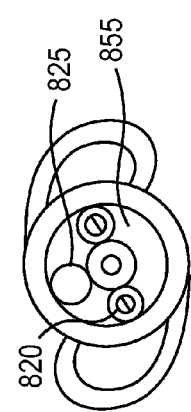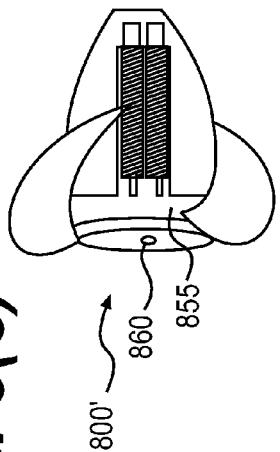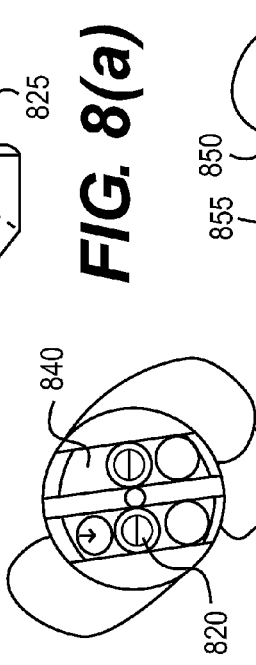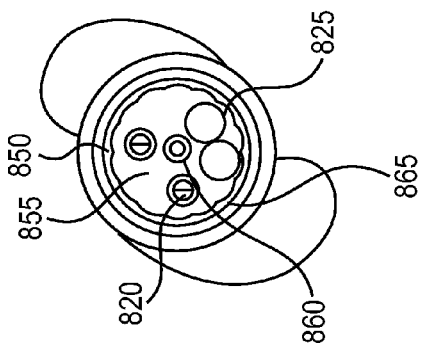

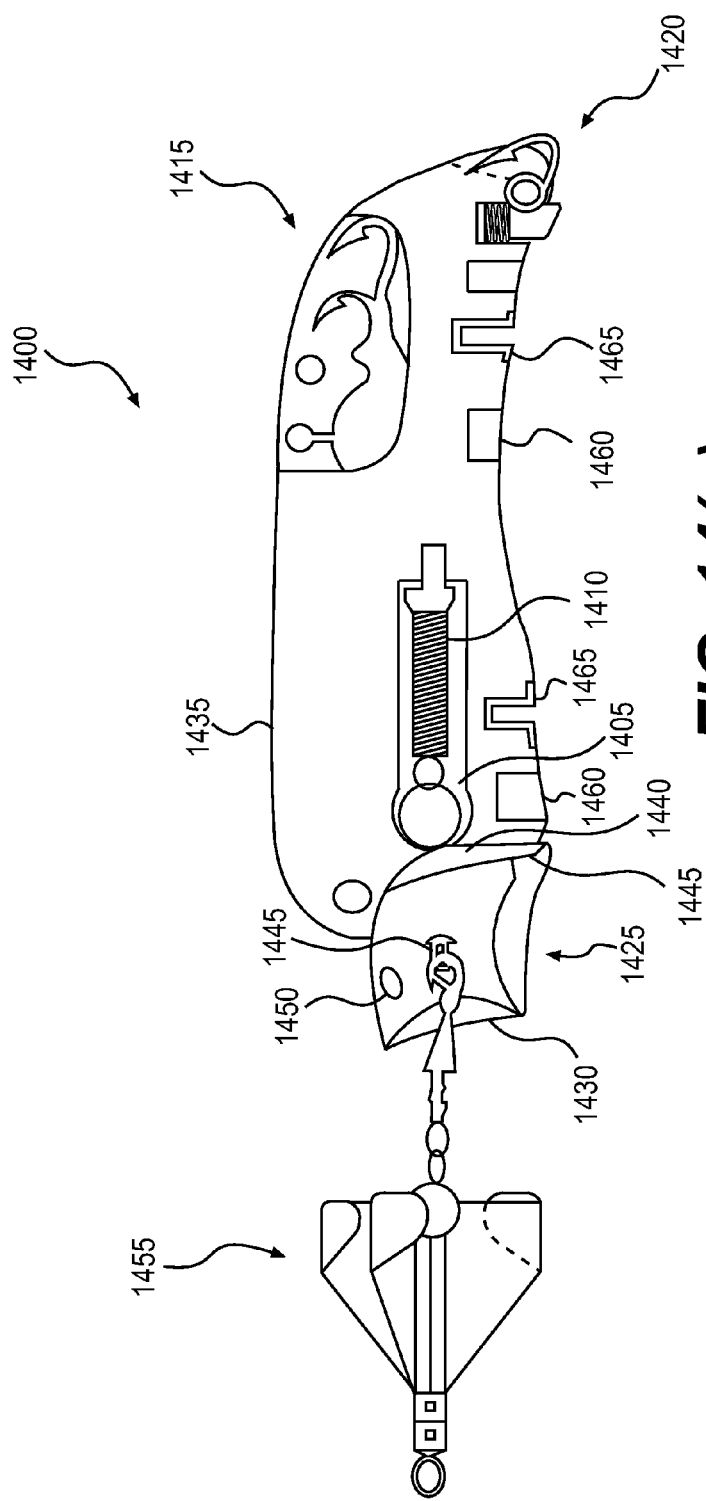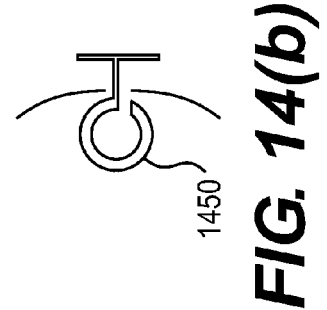

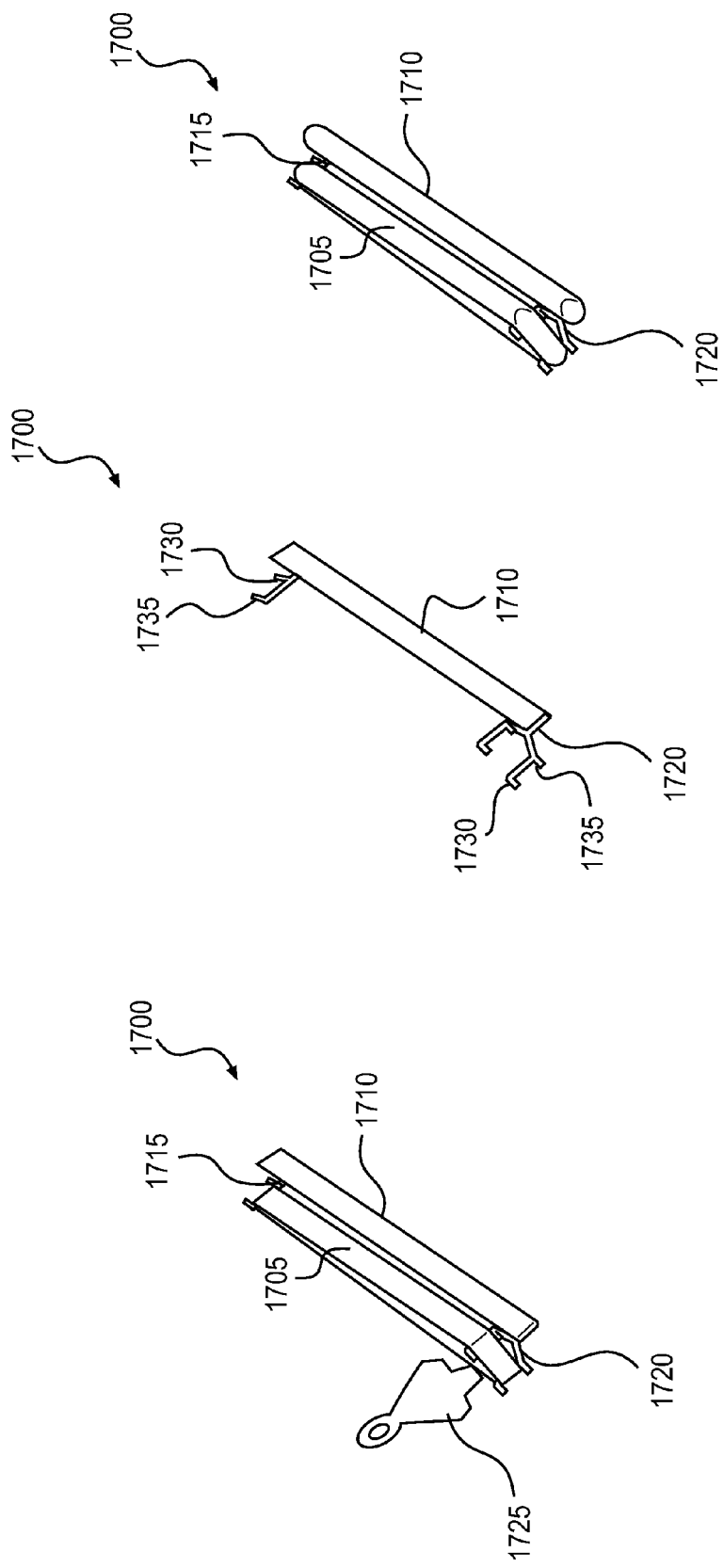

FISHING LURE HAVING AN INERTIALLY-ACTIVATED PIVOTABLE HOOK SYSTEM

CROSS REFERENCE TO RELATED APPLICATIONS

The present application is a continuation of U.S. patent application Ser. No. 13/365,830 filed on Sep. 18, 2012, which is a National Stage application of International Application No. PCT/US2011/30013 filed on Mar. 25, 2011, which claims the benefit of U.S. Provisional Application No. 61/318,004 filed on Mar. 26, 2010, the disclosures of which are expressly incorporated by reference herein in their entireties.

BACKGROUND OF THE DISCLOSURE

1. Field of the Disclosure

The present disclosure is related to a fishing lure that includes a mechanically-actuated tone generation device and a fishing lure having an inertially-activated pivotable hook system.

2. Discussion of Background Information

Fishing lures come in many sizes, shapes and colors. Sophistication among fishing lures varies greatly ranging from a simple hook and sinker to sophisticated spinner arrangements, all designed to attract fish in their own way. The purpose of any fishing lure is to attract a fish by imitating a creature that is a part of the normal diet of the fish, such as, for example, a worm, an amphibian, or a smaller fish.

Some lures are configured based on the theory that different types of fish are attracted by different colors. For example, numerous lures of different, and sometimes quite exotic, colors may be used, depending on the type of fish desired to be attracted. Some lures are designed based on the theory that fish are attracted by bright or shiny objects. For example, lures of various configurations may be designed to reflect sunlight and to attract the attention of fish visually, by interplay of motion and light reflectance. Often the fish appear indifferent to the visual stimulation of these prior art lures and refuse to go after them. Moreover, by the nature of their environment, fish cannot see very far. When the water is not very clear, the shiny reflection or bright colors of the lure are ineffective to attract the attention of the fish since they are unable to see them. Therefore, an improved scheme to attract fish is necessary.

Some lures are designed based on the theory that fish are attracted by sound. As is well known, fish have a nerve system that is stimulated or activated by their lateral line response signals. The fish senses and picks up sound waves and high and low frequency vibrations by their lateral line, one of which is located on each side of their body, i.e., running from behind the gill to the base of the tail. These lateral lines roughly correspond to human ears. While it is understood that such organs do not hear sounds in exactly the same manner as humans, it is well known that such organs are sensitive to sound waves, particularly sound waves transmitted through the water. Likewise, as is well known, water provides an excellent medium for the transmission of sound waves. Numerous lures have been designed that include pieces and accessories that are positioned to physically contact each other and emit sounds with lure movement. Many lures, for example, provide capsules or chambers that support rattles. Others provide metal weights and/or glass beads that are mounted to slide and to physically strike each other. In actual practice, however, water mutes sounds emitted from a lure by dampening movement of the sound making parts. Moreover, while fish may be attracted to lower frequency tones in addition to (or instead of) higher frequency tones, with the known approaches, only higher frequency tones are produced.

What is needed, therefore, is a fishing lure which emits mechanically-actuated lower frequency sound waves to attract fish, or emits both higher frequency sound waves and lower frequency sound waves to attract fish.

SUMMARY OF THE DISCLOSURE

The present disclosure is related to an improved fishing lure. In embodiments, the fishing lure includes a mechanically-actuated tone generation device which produces one or more lower frequency tones alone. Additionally, the tone generation device may also generate a higher frequency tone through mechanical actuation and/or may be combined with a separate mechanically-actuated higher frequency tone generation device.

In embodiments, the tone generation device includes a tone generator (e.g., one or more springs, or tension elements arranged to vibrate upon actuation) and a striker that periodically strikes the tone generator and actuates the tone generation device.

With the present disclosure, some "bled off" energy, for example, produced by the diving bill of, e.g., a crank bait, is harnessed to power, for example, a side-to-side travelling device (e.g., striker). The side-to-side motion may be provided by a diving bill, a walk-the-dog style retriever, a "wobble scoop," and/or "wobble bills," in addition to a manual wrist snap type motion.

In embodiments, the striker may be, for example, a sphere, a pendulum, a cylindrical piece, or any type of sufficiently heavy object, that will travel side-to-side, up and down and/or rotationally, upon retrieve (e.g., winding the fishing string in and/or trolling). As the striker travels from side-to-side, up and down and/or rotationally, the striker impacts a free end of one or more springs to energize the spring or springs, thus producing a low(er) frequency sound in conjunction with a high(er) frequency "click or rattle." For example, this higher frequency click or rattling may be produced by the traveling device, e.g., striker, striking the sides of the placement hole or chamber in which the striker traverses as it passes (e.g., back and forth) over the free end of the one or more springs. Additionally, the higher frequency tone may be replaced and/or enhanced by use of a rattle chamber elsewhere in or on the lure or bait.

In embodiments of the present disclosure, the travel of the striker may be up and down, (vertical), fore to aft, side-to-side, or at an angle. Moreover, in embodiments, the travel of the striker may also be achieved rotationally, amongst other contemplated motions of travel. Additionally, in embodiments, the tone generation device may also be configured as an attachable device (which could be attached to a lure) as well as in or on the lure, e.g., within sloped/concave faces of a lure.

In accordance with further aspects of the disclosure, in embodiments, different springs may be utilized to tune a lure to, for example, attract a specific species of fish. For example, springs are manufactured to produce a tone at very specific frequency. By replacing one spring with another spring (which vibrates at a different frequency, for example), the lure may be specifically tuned to, for example, attract a specific species (or age of a specific species) of fish.

Further aspects of the disclosure are directed to a fishing lure comprising an inertially-activated pivotable hook system having a pivotable hook assembly.

In embodiments of the present disclosure, the travel the pivotable hook assembly is structured and arranged to be pivotable between an un-deployed position and a deployed position.

In embodiments of the present disclosure, the pivotable hook assembly comprises at least one hook.

In further embodiments of the present disclosure, the pivotable hook assembly comprises a plurality of hooks.

In additional embodiments of the present disclosure, the plurality of hooks comprises two hooks in a hook-behind-hook arrangement.

In yet further embodiments of the present disclosure, the two hooks in a hook-behind-hook arrangement comprise a frontward hook and a rearward hook, and when the pivotable hook assembly is in a deployed position, the rearward hook is above the frontward hook.

In embodiments of the present disclosure, the pivotable hook assembly comprises a pendulum mass attached to the lure at a pivot around which the pendulum mass is pivotable; and at least one hook attached to the pendulum mass.

In further embodiments of the present disclosure, the pivotable hook assembly further comprises a connection portion arranged between the pivot and the pendulum mass, and connecting the pivot to the pendulum mass.

In additional embodiments of the present disclosure, the connection portion is structured and arranged to provide range of motion and/or balance to the pivotable hook system.

In yet further embodiments of the present disclosure, the fishing lure further comprises a cavity structured and arranged to accommodate the pivotable hook assembly in the un-deployed position.

In embodiments of the present disclosure, the pivotable hook system further comprises a stop pin structured and arranged within the cavity.

In further embodiments of the present disclosure, the stop pin is structured and arranged to restrain a pivoting motion of the pivotable hook assembly upon reaching a fully deployed position.

In additional embodiments of the present disclosure, the pendulum mass includes a depression structured and arranged to accommodate the stop pin therein upon the pivotable hook assembly reaching a fully deployed position.

In yet further embodiments of the present disclosure, wherein when in the un-deployed position the pivotable hook assembly is positioned such that the at least one hook is recessed within the lure.

In embodiments of the present disclosure, wherein when in the deployed position the pivotable hook assembly is positioned such that the at least one hook is exposed outside the lure.

In further embodiments of the present disclosure the pivotable hook assembly is structured and arranged to move from the un-deployed position to the deployed position upon the pivotable hook assembly receiving a sufficient inertial force; and move from the deployed position to the un-deployed position upon a subsiding of the sufficient inertial force.

In additional embodiments of the present disclosure the pendulum mass is structured and arranged to maintain the pivotable hook assembly in the un-deployed position until a sufficient inertial force is received by the pivotable hook assembly.

In yet further embodiments of the present disclosure, wherein upon receiving the sufficient inertial force, the pivotable hook assembly momentarily pivots towards the deployed position to expose the at least one hook outside the lure.

Further aspects of the disclosure are directed to a method of using the fishing lure comprising an inertially-activated pivotable hook system having a pivotable hook assembly, the method comprising pulling a line attached to the fishing lure to provide an inertial force to the pivotable hook assembly to move the pivotable hook assembly from an un-deployed position, in which a hook of the pivotable hook assembly is recessed within the fishing lure, to a deployed position, in which the hook of the pivotable hook assembly is exposed outside the fishing lure.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings.

FIGS. 4(a)-4(i) illustrate a plurality of views of exemplary end-mounted pendulum striker lures, e.g. crank baits, in accordance with aspects of the present disclosure;

FIGS. 5(a)-5(e) illustrate a plurality of views of an exemplary vertical bait that may be used for pitch and flip type vertical fishing having a pitch-and-flip pendulum striker in accordance with aspects of the present disclosure;

FIGS. 6(a)-6(c) illustrate a plurality of exemplary pinwheel rattle systems in accordance with aspects of the present disclosure;

FIGS. 8(a)-8(g) illustrate various views of an exemplary rotationally-actuated spherical striker bait in accordance with aspects of the disclosure;

FIGS. 14(a)-14(b) illustrate views of an exemplary surface wobble bait with a removable buzz bait in accordance with aspects of the disclosure;

FIGS. 17(a)-17(c) illustrate various views of an elastic tone generation device in accordance with aspects of the disclosure.

DETAILED DESCRIPTION OF THE DISCLOSURE

Spherical Striker

Figure 1A:
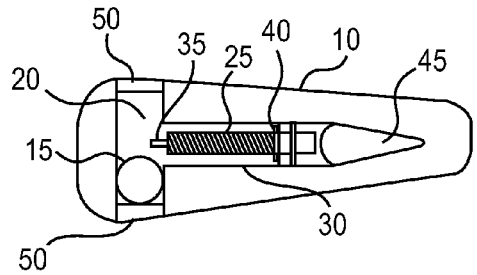
FIGS. 1(a)-1(g) illustrate a plurality of views of an exemplary spherical striker tone generation device in accordance with aspects of the present disclosure.

FIGS. 1(a)-1(g) illustrate a plurality of views of a lure 10 having an exemplary spherical striker 15 in accordance with aspects of the present disclosure. As shown in FIGS. 1(a)-1(f), with this exemplary embodiment, the spherical striker 15 comprises a ball or sphere, for example, a ⅜" ball bearing, which travels side to side in a bore (e.g., "striker passage") 20. In embodiments, the striker passage 20 may comprise 7/16" diameter bore. Additionally, a tone generator (e.g., a spring) 25 is arranged in a bore (e.g. "spring bore") 30, for example, a 5/16" diameter bore. Additionally, as shown in FIG. 1(a), a free end portion 35 of the spring intersects with the striker passage 20 and a fixed end 40 of the spring is attached to, for example, the lure body 10 or to a dowel rod 45 secured within the lure body 10.

In accordance with aspects of the disclosure, as the lure 10 is retrieved, this arrangement of the spring 25 and striker 15 produces a high quality sound (e.g., a lower frequency tone) due to the rounded object (i.e., the striker 15) striking, or "clipping," the free end 35 of the spring 25 as the striker 15 travels laterally from one side of the lure to the other. The striking of the spring 25 energizes the spring 25 causing the same to vibrate and produce the lower frequency sound or sonic energy. Moreover, as the spherical striker 15 impacts the end walls 50 (or caps) of the striker passage 20 (in traversing side to side, past the free end of the spring), the spherical striker 15 produces a high or medium frequency sound (e.g., a drum or clicking) in conjunction with the lower frequency sound to further attract fish. In embodiments, this high or medium frequency sound can be enhanced by the material type of the end walls 50. In embodiments, the lower frequency sound may be more constant than the higher frequency clicking, as the spring, once energized, sustains (e.g., continues to vibrate) to some extent. In embodiments, the extent of sustain can be varied due to any of several factors. These factors include, for example, the spring material type and gauge (or diameter), whether multiple springs (e.g., mounted side by side and/or concentrically mounted) and/or sustain bars or sustain frames (discussed below) are utilized.

Figure 1B:
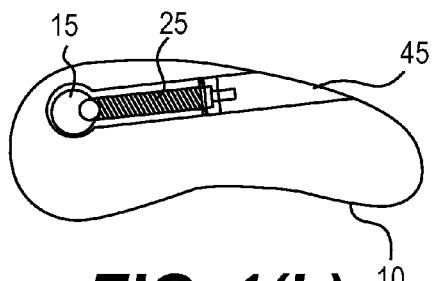
Figure 1C:
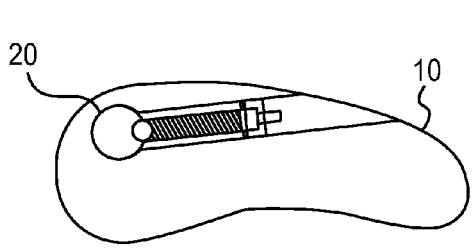
Figure 1D:
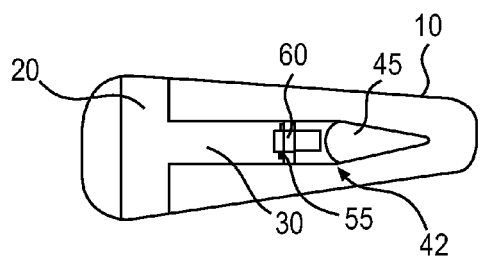
Figure 1E:
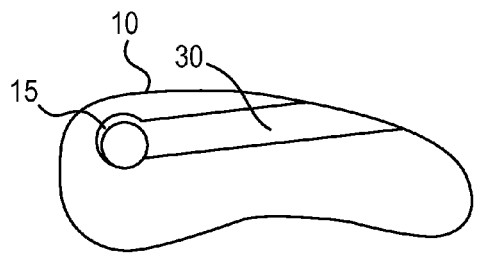
Figure 1F:
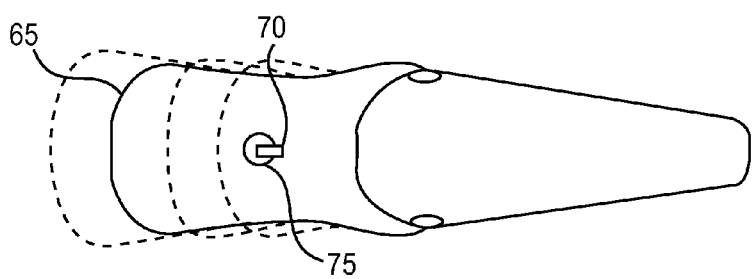
Figure 1G:
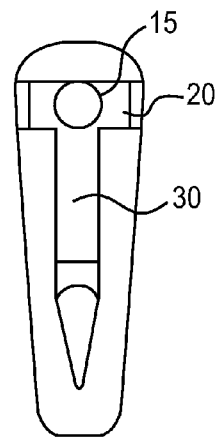

FIG. 1(a) illustrates an exemplary sectional top view of the spherical striker embodiment 10 with the internal components that includes a striker 10 and spring 25. FIG. 1(b) illustrates an exemplary sectional side view of the spherical striker embodiment 10 and the internal components of the striker 15 and spring 25. FIG. 1(c) illustrates an exemplary sectional side view of the spherical striker embodiment 10 with the striker 15 removed to more clearly illustrate the striker channel 20. FIG. 1(d) illustrates an exemplary sectional top view of the spherical striker embodiment 10 in which striker 15 and spring 25 are not illustrated in order to more clearly show the striker channel 20, the spring bore 40, and the dowel assembly 42. In embodiments, the dowel assembly 42 may comprise a mounting dowel 45 (e.g. wooden mounting dowel), a flat spring base 55 (e.g., a washer), and a mounting shaft 60. In embodiments, the components of the dowel assembly 42 along with the spring 25 may be mounted to one another using, for example, an adhesive (e.g., epoxy or other glue), welding and/or brazing. FIG. 1(e) illustrates an exemplary sectional side view of the spherical striker embodiment 10 without spring 25 to more clearly illustrate the spring bore 40. FIG. 1(f) illustrates an exemplary top view of the spherical striker embodiment 10 with an attached diving bill 65, for example, a deep bill, along with alternative sized bills represented in dashed lines (e.g., shallow, medium and extra-deep, or "X-deep"). As is understood by those of ordinary skill in the art, the various diving bill lengths are suitable for varying depth applications. Additionally, FIG. 1(f) illustrates a tie eye 70 and an optional split ring 75 on the diving bill 65. FIG. 1(g) illustrates an exemplary sectional top view of the spherical striker embodiment 10 without spring 25 to more clearly illustrate the spring bore 40.

Additionally, in accordance with aspects of the disclosure, the use of a ball bearing as a striker 15 simplifies manufacture, which reduces costs for manufacture. That is, in accordance with aspects of the disclosure, the spherical striker embodiment has an advantage of being easy to build. For example, in embodiments, the present disclosure may be manufactured by first drilling the striker passage 20 (e.g., the 7/16" bore) and then drilling the spring bore 30 (e.g., the 5/16" bore) in the lure body 10. In drilling the spring bore 30, one can see precisely where the drilling needs to stop (e.g. at the connection with the previously drilled striker passage). The spring 25 is then mounted in (or on) a dowel rod 45, e.g., a 5/16" dowel rod and the spring and dowel rod assembly 42 is mounted within the spring bore 30, for example, using an adhesive (which effectively plugs or seals the 5/16" hole of the spring bore). Additionally, in embodiments, the spring 25 and dowel rod assembly 42 may be mounted in the spring bore 30 using a frictional fit. Further, in accordance with aspects of the disclosure, the striker passage 20 is suitably closed on each end thereof to maintain the striker (e.g., ball bearing) within the striker passage. In accordance with aspects of the disclosure, as the lure moves through the water and undergoes, e.g., a side-to-side motion, the striker 15 impacts the free end 35 of the spring 30 to actuate the low frequency tone. Moreover, as the striker 15 impacts the ends of the striker passage 50 (or end caps), a higher frequency tone (e.g., a clicking) is generated.

While the above non-limiting exemplary embodiments has been explained with particular dimensions, it should be understood that the disclosure contemplates other dimensions. For example, in accordance with aspects of the present disclosure, the lure is easy to scale up or down in size. Additionally, the bores (e.g., the spring bore and the striker passage) should be sized so that they do not impair the buoyancy (or negative buoyancy) of the lure. For example, if the bore holes are too large, the air contained within the bores may cause the lure to be too buoyant.

Additionally, in accordance with further aspects of the disclosure, in embodiments, the present disclosure may include side mounted springs (not shown) arranged on the ends of the striker passage 20. In embodiments, these side mounted springs may add different pitch tones as well as assist the spherical striker 15 in its side-to-side travel. Furthermore, when the side mounted springs are used, the higher frequency clicking produced by the spherical striker 15 contacting the end walls of the striker passage 20 may be lower in volume, or not occur. Thus, in embodiments, a rattle chamber (not shown) may be incorporated in the lure in order to produce a higher frequency tone (e.g., the "clicking"). Additionally, in embodiments, weights may be added or removed to control the depth of the dive of the lure.

Furthermore, in embodiments, the lure may include flat surfaces on the lure (e.g., on the sides of the lure) to facilitate assembly by visually impaired individuals.

Multiple Springs and Sustaining Systems

FIGS. 2(a)-2(g) illustrate a plurality of exemplary spring assemblies having sustaining systems and multiple spring arrangements in accordance with aspects of the present disclosure. In embodiments, the spring may comprise a coil spring, a flat spring and/or a wavy spring, as well as any other springs contemplated by those ordinarily skilled in the art. Furthermore, in embodiments, a lure may comprise multiple springs, for example, in a side-by-side arrangement and/or a concentric (e.g., coil-in-coil) arrangement. In embodiments, the spring assembly may include a sustaining system. For example, sustain arms and/or a small spring within a large spring will generate sustain while retrieve is paused. That is, employing sustain arms and/or a small spring within a large spring provides for extra sustain of the spring after it has been actuated. Thus, in accordance with aspects of the disclosure, in embodiments, when the lure (or bait) is paused the spring will continue to vibrate absent any actuation by the striker.

Figure 2C:
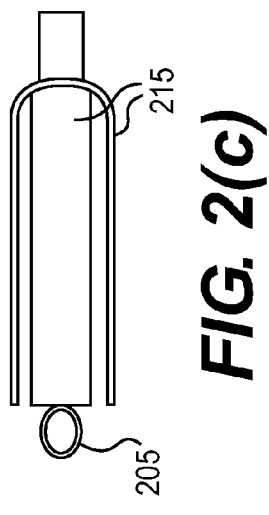
FIGS. 2(a)-2(g) illustrate a plurality of exemplary sustaining systems and multiple spring arrangements in accordance with aspects of the present disclosure.
Figure 2F:
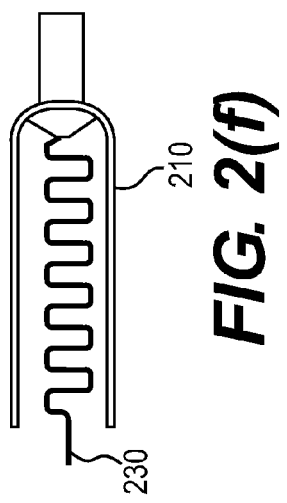
Figure 2B:
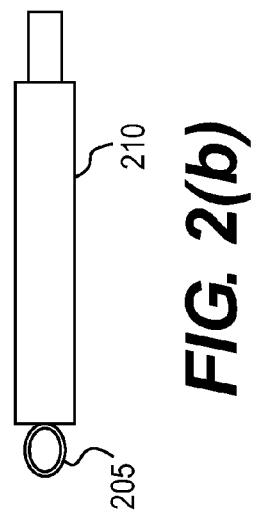
Figure 2E:
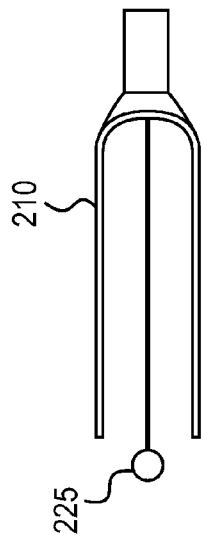
Figure 2G:
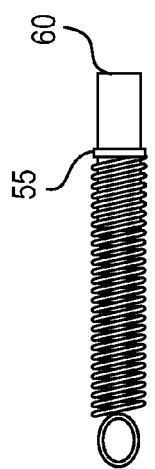
Figure 2A:
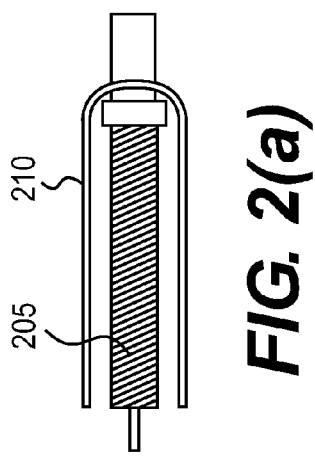
Figure 2D:
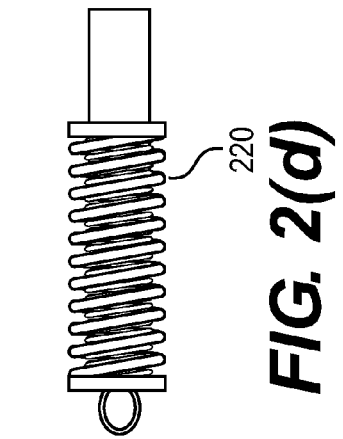

FIG. 2(a) illustrates a top view of an exemplary spring assembly comprising a single coil spring 205 and a "half frame" sustain bar 210 for providing sustain. As shown in FIG. 2(a), the "half frame" sustain bar 210 is formed on two sides of the spring 205. In accordance with aspects of the disclosure, the spring assembly (e.g., the spring 205 and sustain bar 210) are fixed in the spring bore, such that one end of the spring remains free and the other end of the spring and the sustain bar are fixedly attached to the bait body. FIG. 2(b) illustrates a side view of the exemplary spring assembly depicted in FIG. 2(a), in which an end of the single coil spring 205 is shown extending from the "half frame" sustain bar 210. FIG. 2(c) illustrates a side view of another exemplary spring assembly comprising a single coil spring 205 and a "full frame" sustain bar 215 for providing sustain. The "full frame" sustain bar 215 is formed on four sides of the spring 205. FIG. 2(d) illustrates a side view of still another exemplary spring assembly comprising multiple coil springs 220 concentrically mounted to provide a "coil-in-coil" spring arrangement. In embodiments, the multiple springs may be structured and arranged to vibrate independently of one another (e.g., without contact) and/or structured and arranged to vibrate in contact with one another. In accordance with aspects of the disclosure, the "coil-in-coil" spring configuration provides the ability to project more than one tone, or the same tone at different octaves, amongst other possibilities. Moreover, the "coil-in-coil" spring configuration also provides for additional sustain. Furthermore, "coil-in-coil" spring configuration is advantageous due to its ease of manufacture.

FIG. 2(e) illustrates a side view of an exemplary spring assembly comprising a flat spring 225 and a "half frame" sustain bar 210 for providing sustain. FIG. 2(f) illustrates a side view of an exemplary spring assembly comprising a wavy spring 230 and a "half frame" sustain bar 210 for providing sustain. FIG. 2(g) illustrates an exemplary spring assembly a single coil spring 205, along with the mounting shaft 60 and the flat spring base 55 (e.g., a washer). As shown in FIG. 2(g), in embodiments, the spring 205 is mounted on the mounting shaft 60 and in contact with the flat spring base 55.

The present disclosure has the advantage that retrieval can be paused, for example, when weights are employed to create negative buoyancy. Additionally, in embodiments, the spring assembly may include one or more sustaining systems. For example, sustain arms and/or a small spring within a large spring will generate sustain while retrieve is paused. That is, employing sustain arms and/or a small spring within a large spring provides for extra sustain of the spring after it has been actuated. Thus, in accordance with aspects of the disclosure, when the lure is paused the spring will continue to vibrate absent any actuation by the striker.

In embodiments, for example, for a pause/suspend model, magnetic springs may be added on outside of "tone" springs. That is, as explained above, additional springs (e.g., magnetic springs) may be arranged concentrically to surround the two illustrated springs to provide extra sustain to the springs upon actuation. Thus, when the lure is paused (e.g., not being retrieved) the extra sustain will allow the springs to continue to generate the low frequency tone.

In accordance with further aspects of the disclosure, in embodiments, different springs may be utilized to tune a lure to, for example, attract a specific species of fish. For example, springs are manufactured to produce a tone at very specific frequency. By replacing one spring with another spring (which vibrates at a different frequency, for example), the lure may be specifically tuned to, for example, attract a specific species (or age of a specific species) of fish.

In embodiments, the lower frequency tone(s) generated by the vibrating spring(s) may be at least one octave lower than the higher frequency clicking (e.g., produced by a rattle chamber). In embodiments, the lower frequency tone(s) generated by the vibrating spring(s) may be lower than 440 Hz. In additional embodiments, the lower frequency tone(s) generated by the vibrating spring(s) may be 220 Hz or lower. In further embodiments, the lower frequency tone(s) generated by the vibrating spring(s) may be between 45 Hz and 220 Hz. As there are springs that are manufactured to produce a tone at very specific frequencies, the inventor contemplates that any spring manufactured to produce a tone at a specific frequency may be utilized in the present disclosure, any of these springs should produce a lower frequency tone than a higher frequency clicking, e.g., from a rattle chamber.

Pendulum Striker

According to further aspects of the disclosure, the striker arrangement may comprise a pendulum striker, instead of a spherical striker. In embodiments, the pendulum striker may comprise a top-mounted, a bottom-mounted and/or a center/swivel mounted pendulum. While, each pendulum striker embodiment employs the same side-to-side forces to work, the different pendulum embodiments have varying applications.

FIGS. 3(a)-3(h) illustrate a plurality of views of exemplary center-mounted pendulum strikers in a lure, e.g., a crank bait, in accordance with aspects of the present disclosure. In accordance with aspects of the present disclosure, the center-mounted pendulum strikers harness the side-to-side travel (and energy) of the lure to energize the springs. For example, as shown in FIGS. 3(a)-3(h), in embodiments, the striker may comprise a pendulum striker 305 arranged on a center pivot axis 310 (e.g., between the striker element 315 and the pendulum weight 320) to swing, for example, side-to-side. One or more striker elements 315 on the pendulum striker 305 are arranged to strike the free ends 325 of one or more springs 330, which extend into the path of the pendulum striker elements 315. In embodiments, the pendulum striker 305 may be structured and/or configured to have, for example, a teardrop shape or a spherical shape, amongst other contemplated shapes.

Figure 3A:
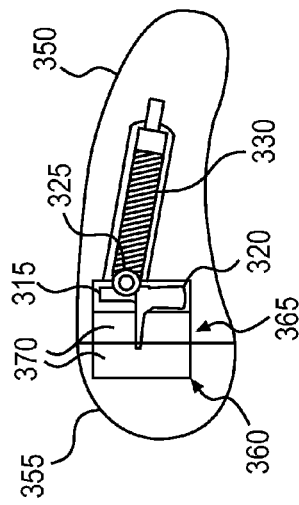
FIGS. 3(a)-3(h) illustrate a plurality of views of exemplary center-mounted pendulum strikers in a lure, e.g., a crank bait, in accordance with aspects of the present disclosure.
Figure 3B:
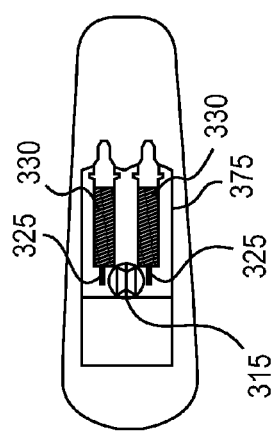
Figure 3C:
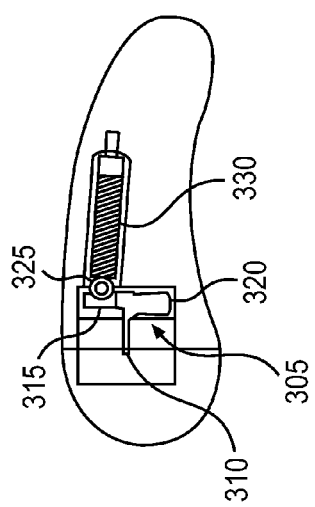
Figure 3D:
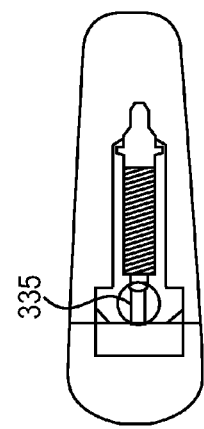
Figure 3E:
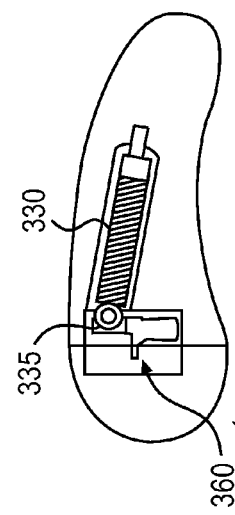
Figure 3F:
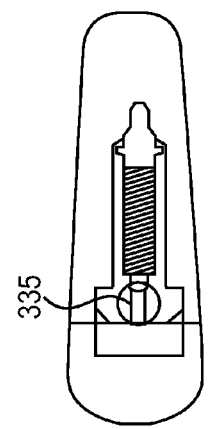
Figure 3G:
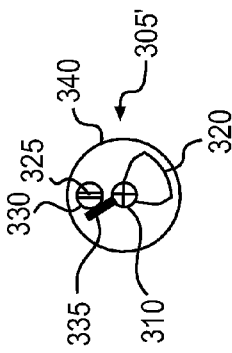

FIG. 3(g) illustrates a front cut-away view of an exemplary center-mounted pendulum 305 having a "V" style striker 315 (or dual striker) and one coil spring 330 in a pendulum hole 340 in accordance with aspects of the disclosure. As shown in FIG. 3(g), because the striker elements of the "V" style striker 315 do not contact the free end 325 of the spring, when the lure is not in retrieval (or during pause), the "V" style striker 315 does not deaden the vibration of the spring (or springs).

Figure 3H:
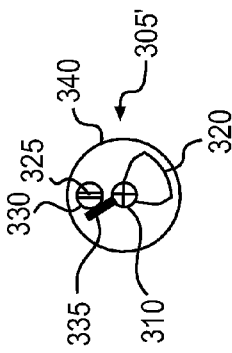

FIG. 3(h) illustrates a front cut-away view of an exemplary center-mounted pendulum 305' having an "I" style 335 (or single striker) and one coil spring 330 in a pendulum hole 340 in accordance with aspects of the disclosure. As shown in FIG. 3(h), because the striker element of the "I" style striker 335 contacts the free end 325 of the spring, when the lure is not in retrieval (or during pause), the "I" style striker 335 deadens the vibration of the spring (or springs).

FIGS. 3(a) and 3(b) illustrate a side view and a top view, respectively, of an exemplary center-mounted pendulum having a "V" style striker 315 (or dual striker) and two coil springs 330 in accordance with aspects of the disclosure. The two springs in conjunction with the "V" style striker 315 allow sustain of the springs to continue during a pause in retrieval in accordance with aspects of the disclosure. For example, the "V" striker 315 assists with a sporadic retrieve, in that, when the lure is not in motion, the striker 315 is oriented such that it does not touch the spring(s) 320, as shown in FIG. 3(b). Therefore, the springs' vibrations are not muted, and the springs continue to sustain (or vibrate). Also, in embodiments, the "V" striker 315 provides a more constant tone (or tones) due to more frequent striking.

FIGS. 3(c) and 3(d) illustrate a side view and a top view, respectively, of another exemplary center-mounted pendulum 305 having a "V" style striker 315 (or dual striker) and one coil spring 330 in accordance with aspects of the disclosure. FIGS. 3(e) and 3(f) illustrate a side view and a top view, respectively, of still another exemplary center-mounted pendulum 305' having an "I" style striker 335 (or single striker) and one coil spring 330 in accordance with aspects of the disclosure.

An exemplary and non-limiting assembly method of the pendulum embodiment comprises first marking a center line on the lure body. In embodiments, a bow should be maintained in the top of the lure for a sufficient spring hole clearance, e.g., at least 3⅜". Next, a lure body is cut with, e.g., scroll saw, to create a flat-sided, bottom and topped body, for example, 1¼" tall, 1¼" wide at the widest point and 3⅜" long. Next, the front end of the lure body 355 may be cut off and removed, and the bore for the spring (i.e., spring bore 375) and hollowed region 365 (e.g., larger diameter bore) for the pendulum striker are provided. As shown, for example, in FIG. 3(c), in embodiments, the hollowed region for the pendulum striker 315 may include bored regions 360, 365 in both the back end lure body 350 and the front end lure body 355. In embodiments, one or more structures 370 may be arranged in bored region 360 and/or bored region 365. In embodiments, the one or more structures 370 may be wooden dowels sized to fit the bored region 360 and/or bored region 365, which may be secured therein using an adhesive, fastener and/or a frictional-fit engagement. Moreover, as shown, for example, in FIGS. 3(g) and (h), the hollowed region (e.g., bored regions 360 and/or 365) should be sized to allow sufficient space within the hollowed region for the pendulum striker to properly pivot within the pendulum hole 340. For example, with a ¾" pendulum bore, a ⅛" free board clearance may be provided.

Subsequently, the spring (or springs) 330 are mounted in the spring bore (or spring bores) 375 and the pendulum striker 305 is mounted within the hollowed region (or pendulum hole 340) of the lure body. According to aspects of the disclosure, flat sides 333 of the lure body, for example, as shown in FIG. 3(d), create flat(s), which provide reference points, for example, within a drill press, during further processing, e.g., when turrets (or turnstiles) are provided, for example, for the pendulum striker 305.

FIG. 4 illustrates a plurality of views of exemplary end-mounted pendulum striker lures, e.g. crank baits, in accordance with aspects of the present disclosure. In embodiments, the end-mounted pendulum striker employs an end mounted pendulum system that swings to impact a spring mounted within a spring bore. That is, in contrast to the centrally-mounted striker, where the pendulum swings an actuator (e.g., the "V" style actuator) on the opposite side of pendulum mass to actuate the spring, the end-mounted pendulum striker utilizes a pendulum mass or a connection portion (between the pendulum mass and end mounting) to actuate the spring (e.g., the pendulum mass also acts as the striker). In accordance with aspects of the disclosure, the end-mounted pendulum striker lures, e.g. crank baits, are suitable for constant retrieve.

FIGS. 4(a) and 4(b) illustrate side and top cut-away views, respectively, of an exemplary end-mounted pendulum striker lure 400 having a top-mounted single striker pendulum 405 attached at a top mounting 410 via a connection portion 425 in accordance with aspects of the disclosure. FIG. 4(c) illustrates a side and a front view of an exemplary end-mounted pendulum single striker 405 and a connection portion 425 in accordance with aspects of the disclosure. In embodiments, the connection portion 425 may comprise a wire, amongst other suitable materials. As shown in FIG. 4(a), with this exemplary embodiment, the pendulum mass also acts as the striker (i.e., impacts the free end of the spring(s) 420).

FIGS. 4(d) and 4(e) illustrate a side and a top view, respectively, of an exemplary end-mounted pendulum striker lure 430 having a top-mounted "A frame" pendulum striker 435 attached at a top mounting 410 in accordance with aspects of the disclosure. In embodiments, the "A frame" striker 435 comprises an "A frame" shaped connection portion 440, e.g., wires, between the end mounting 410 and the pendulum mass 450. In embodiments, the "A frame" shaped connection portion 440 may comprise, for example, two, three or more wires 442, between the end mounting 410 and the pendulum mass 450. FIG. 4(f) illustrates a front and a side view of an exemplary "A frame" striker 435 in accordance with aspects of the disclosure. As shown in FIG. 4(d), with this exemplary end-mounted pendulum striker, a portion of the "A frame" striker (e.g., the connection portion 440) acts as the striker. In accordance with aspects of the disclosure, the "A frame" striker 435 is beneficial for a sporadic retrieve, as the wires of the connection portion 440 are arranged to straddle the spring end 455 when the "A frame" striker 435 is not swinging side-to-side (e.g., during pause or when not retrieving).

FIGS. 4(g) and 4(h) illustrate side and top cut-away views, respectively, of an exemplary end-mounted pendulum striker lure 470 having a single bottom-mounted pendulum striker 475 attached at a bottom mounting 480 via a connection portion 485 in accordance with aspects of the disclosure. FIG. 4(i) illustrates a front view of an exemplary bottom-mounted pendulum single striker 475 in accordance with aspects of the disclosure. As shown in FIG. 4(g), with this exemplary embodiment, the pendulum mass 490 also acts as the striker. In accordance with aspects of the disclosure, in embodiments, the bottom-mounted pendulum striker 475 also is beneficial for a sporadic retrieve, as during pause or when not retrieving, as shown, for example in FIGS. 4(h) and 4(i), the pendulum mass 490 is clear of the free end 495 of the spring 420 and does not actuate the spring 420.

As shown in the various views of the end-mounted pendulum strikers, the pendulum may take various forms, styles and/or designs. For example, as shown in FIG. 4(d), the pendulum may include a weight suspended from two side wires, such that as the pendulum swings the two wires each strike the tone spring. Additionally, for example, in embodiments the pendulum may be configured in a downward "V" shape, such that as the pendulum swings the two legs of the "V" shape each strike the tone spring. Furthermore, in embodiments, for example as shown FIG. 4(g), the pendulum may be configured as a vertical pendulum, such that as the pendulum swings it strikes the tone spring. It should be noted that, in embodiments, the configuration of the pendulum may also affect the generated low-frequency tone.

Pitch-and-Flip Pendulum Striker

According to further aspects of the disclosure, the striker arrangement may comprise a pendulum striker designed for pitching and flipping, i.e., a pitch-and-flip pendulum striker. With pitching and flipping, the lure may not be trailed through the water (and thus, for example, there may be no side-to-side forces acting on the lure). Instead, with pitching and flipping, the lure is placed in the water and may remain relatively stationary. Thus, in accordance with aspects of the disclosure, to activate the tone generator (e.g., the spring) with the pitch-and-flip pendulum striker, for example, a fisherman (or angler) grasps the lure at the front and engages the pendulum with, e.g., a wrist snap. The wrist snap causes the pendulum striker to impact the free end of the spring(s). Then the fisherman pitches (or flips) the bait (or lure) out into the water, whereupon it begins to sink.

In accordance with aspects of the disclosure, in embodiments, the pitch-and-flip pendulum striker may utilize a stiffer spring, multiple springs and/or a sustain bar, for example, to increase sustain of the tone. The stiffer spring and/or the sustain arms cause the bait to "hum" as it is sinking, e.g., for 15-20 seconds. In accordance with aspects of the disclosure, the spring selection and/or configuration, sustain arms and/or striker configuration, amongst other variables, may be used to tune the "hum" to imitate other forms of prey, such as, for example, craw dads, frogs, and even terrestrial creatures such as, for example, mice, baby squirrels, etc.

FIGS. 5(a) and 5(b) illustrate side and top cut away views, respectively, of an exemplary vertical bait 500 (or lure) that may be used for pitch and flip type vertical fishing having a pitch-and-flip pendulum striker 505 in accordance with aspects of the present disclosure. As shown in FIG. 5(a), the exemplary vertical bait 500 includes two coil springs 510, 515 in a coil-in-coil (or concentric) configuration, which are used to increase the sustain of the bait 500. In embodiments, as shown in FIG. (a), the bait 500 also may include one or more weights 520 to cause the bait 500 to sink, in accordance with the flip and pitch style.

As shown in FIG. 5(b), in accordance with aspects of the disclosure, the vertical bait 500 uses an in-line (or parallel) pendulum striker 505 having a pivoting axis 525 approximately perpendicular to the longitudinal axis of the bait 500. The pendulum striker 505 includes a pendulum mass 535 and a striker 530, and is structured and arranged to pivot around pivot axis 525, e.g., with a wrist snap, such that the striker 530 impacts the free end(s) 540 of spring 510 and/or spring 515 to produce the lower frequency "hum."

In accordance with aspects of the disclosure, the pendulum striker 505 may be engaged with the springs 510, 515 by a wrist snap, whereupon the bait 500 is pitched into the water. As the bait 500 sinks (for example, due in part, to the weights 520), the springs 510, 515 continue to "hum." As shown in FIG. 5(a), in embodiments, the sides of the bait 500 may include gripping faces 545 (e.g., elongated ovals) to assist in the snap.

Additionally, in embodiments, the bait 500 may include an external rattle to produce a higher frequency tone. FIG. 5(a) illustrates an exemplary optional pin wheel rattle 550 which is structured and arranged to produce a higher frequency tone in accordance with aspects of the disclosure. The pin wheel rattle 550 includes a plurality of "buckets" or cup devices 555 that catch the water as the bait 500 sinks to cause the pin wheel rattle to rotate around pivot axis 560. The pin wheel rattle 550 also includes a plurality of beads 565 on one or more wires structured and arranged to slide, turn and click together to produce the higher frequency "rattle." In embodiments, the beads 565 may comprise metal, glass and/or ceramics, amongst other materials. Additionally, in embodiments, discs (not shown) of similar materials may be used in addition to or in place of the beads 565. In embodiments, a guard bead 552 may be arranged in front of the pin wheel rattle 550 along a fishing line 554 at varying distances. The guard bead 552 is operable to protect the pinwheel rattle 550 from hang-ups or snags. FIGS. 5(a) and 5(b) also illustrate an exemplary optional hook rattle 570 (that also produces a higher frequency rattle tone), which may be attached directly or indirectly to the rear end of the bait 500.

FIG. 5(b) also illustrates a tube-type hook lock 575 structured and arranged to slide over a hook eye 580 of a trailer hook 585. In accordance with aspects of the disclosure, the tube-type hook lock 575 stiffens the trailer hook 585 to provide an increased hook-up-to-strike ratio. Additionally, in embodiments, the tube-type hook lock 575 is operable to lock a trailer hook 585 (only partially illustrated in FIG. 5(b)) at a desired angle.

FIG. 5(c) illustrates a sectional view of the bait 500 having an exemplary inertia hidden (or sunken) hook system 590 in a cavity 588 of the bait 500 in accordance with aspects of the disclosure. As shown in FIG. 5(c), in embodiments, the inertia hidden (or sunken) hook system 590 comprises one or more hooks 592 (e.g., hooks 592' and 592") attached to a pendulum mass 594, which pivots about pivot 596 from a "hidden" position (shown in FIG. 5(a)) to an "exposed" position. The inertia hidden hook system 590 also includes a stop pin 598 (shown in FIG. 5(a)) structured and arranged to halt the pivoting of the mass 594 (and hook(s) 592). In embodiments, the inertia hidden hook system 590 also includes a connection portion 597 connecting the mass 594 to the pivot 596 structured and arranged to provide an appropriate range of motion and balance to the hidden hook system 590.

As shown in FIG. 5(a), in embodiments, the inertia hidden (or sunken) hook system 590 comprises two hooks (e.g., in a tandem hook-behind-hook arrangement). Additionally, as shown in FIG. 5(c), in embodiments, the rearward hook 592" is higher (or above) the frontward hook 592' when in the exposed position. In accordance with aspects of the disclosure, the tandem two-hook arrangement facilitates a higher hook-up-to-bite ratio than a single hook. Additionally, the tandem two-hook arrangement allows for a thin profile of the hooks and/or the lure itself. Also, in accordance with aspects of the disclosure, when the hooks of the tandem two-hook arrangement embed in a fish's mouth, due to the hook-behind-hook arrangement, the fish is robbed of leverage, making it more difficult for the fish to "throw" the lure.

In operation, the inertia hidden hook system 590 remains recessed within the bait 500 until a user, for example, pulls or jerks hard to make the hidden hook(s) 592 fly back/up to the exposed position. Further, the inertia hidden hook system 505 is structured and arranged such that the pendulum mass 594 holds the hook(s) 592 inside the bait 500 until the rod is yanked upward (e.g., violently) to set the hook as the fisherman would if fishing with a thick bodied soft plastic bait. This forward (e.g., sudden) motion of the bait 500 causes the pendulum mass 594 to fly upward/backward to expose the hook(s) 592 that then embed in the roof of the fish's mouth.

It should be understood that the position of the hidden hook system 590 illustrated in FIG. 5(c) is relatively quick (unless, of course, if the hook(s) snag a fish), and the hidden hook system 590 tends to pivot back to the "hidden" position shown in FIG. 5(a). That is, as the bait 500 stops accelerating, the hook(s) 592 drop back into the cavity 585 of the bait 500.

FIG. 5(d) illustrates an exploded view of an exemplary removable trailer system 572 in accordance with aspects of the disclosure. In embodiments, the removable trailer system 572 may be used, for example if fish are being missed, to add a trailer hook 585. In embodiments, the removable trailer system 572 may be arranged, for example, on an end of the lure. In embodiments, the removable trailer system 572 includes a spring 578, and a push button/hook 574, e.g., a vertical hook eye with an attached barb. The push button/hook 574 includes a guide stud 573 and drain hole 576. In accordance with aspects of the disclosure, the drain hole may be provided so that the bait 500 does not retain water when not in use.

In embodiments, the removable trailer system 572 also includes a spacer 575 and a pivot pin 577 for securing the push button/hook 574 within cavities 591 and 593, e.g., milled cavities. In operation, when a user pushes up on the push button/hook 574, the push button/hook 574 rotates about the pivot pin 577, and pushes the point and barb of the vertical hook eye away from the back of the lure body, e.g., cavity 593, so the user can, for example, place a trailer hook 585 thereon. Additionally, cavity 593 allows the hook end to be recessed when the push button/hook 574 is not depressed.

FIGS. 6(a)-6(c) illustrate a plurality of exemplary pinwheel rattle systems in accordance with aspects of the present disclosure. As noted above, rattles may be used to produce a higher frequency tone. FIG. 6(a) illustrates an exemplary internal pinwheel rattle system 600 in accordance with aspects of the present disclosure. As shown in FIG. 6(a), the pinwheel rattle 605 includes a plurality of "buckets" or cup devices 555 that catch the water as the bait 500' sinks to cause the pin wheel rattle 605 to rotate around pivot axis 610. The pin wheel rattle 605 also includes a plurality of beads and/or discs 565 on one or more wires structured and arranged to slide, turn and click together to produce the higher frequency "rattle." In embodiments, the beads 565 may comprise metal, glass and/or ceramics, amongst other materials. In embodiments, for example, castanet-type devices may be mounted between the beads 565 to diversify the tone pitches or frequencies.

As shown in FIG. 6(a), with the internal pinwheel rattle system 600, the bait body may be milled to provide a cavity 615 having one or more intake ports 620 and one or more exhaust ports 625. In accordance with aspects of the disclosure, by providing, for example, more (or larger) intake ports 620, and less (or smaller) exhaust ports, as the bait 500' sinks, the water flow accelerates through the narrowing cavity 615, thus increasing the rate of spin of the internal pinwheel rattle 605. In accordance with additional aspects of the disclosure, by providing the pinwheel rattle 605 internally within the bait 500', the bait 500' has less external parts thus, being less susceptible to catching weeds. In other words, the internal pinwheel rattle 605 enhances the "weedlessness" of the bait. Additionally, in embodiments, one or more screens (not shown) may be provided over the intake port(s) 620 to further enhance the weedlessness properties of the bait 500'. In embodiments, one or more pins 630 may traverse the inlet opening(s) 620, and may be used for fastening a screen over the intake port(s) 620.

FIG. 6(b) illustrates an exemplary external pinwheel rattle 550 spread out on the fishing line 554. Additionally, as shown in FIG. 6(b), in embodiments, a guard bead 552 may be provided on the fishing line 554, for example, to protect the pinwheel rattle from hang-ups. Further, in embodiments, the fishing line 554 may be provided with one or more spacer beads 635. FIG. 6(c) illustrates an external pinwheel rattle 550 on the fishing line 554 closer than the arrangement of FIG. 6(d). It should be understood that, in embodiments, the disclosure contemplates the use of the internal and external pinwheel rattle both separately and in combination.

Figure 7A:
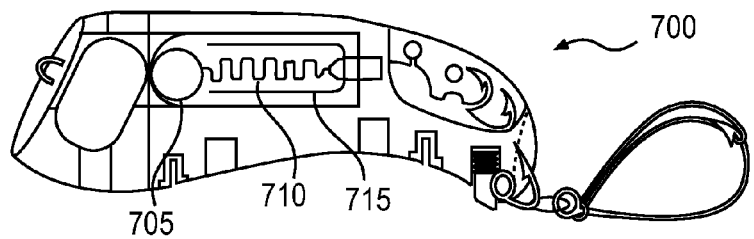
FIGS. 7(a)-7(e) illustrate various views of exemplary vertical pitch and flip type baits having a spherical striker in accordance with aspects of the present disclosure.
Figure 7B:
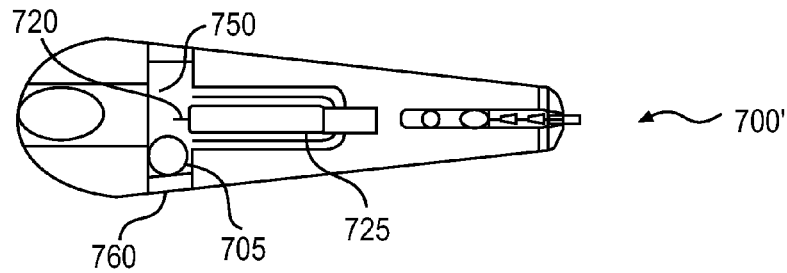
Figure 7C:
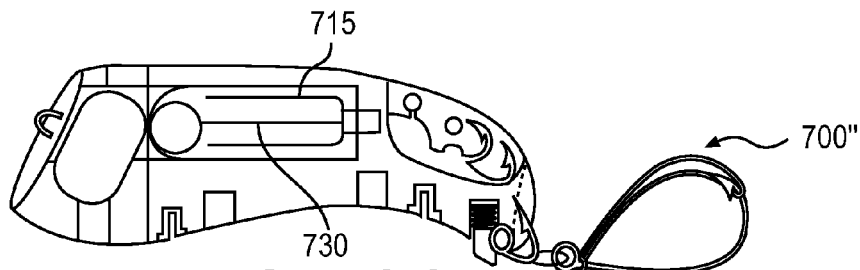
Figure 7D:
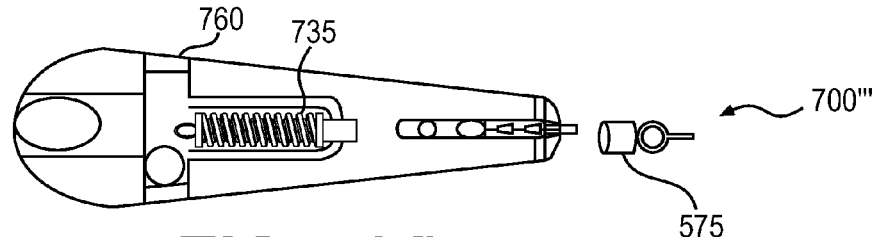
Figure 7E:
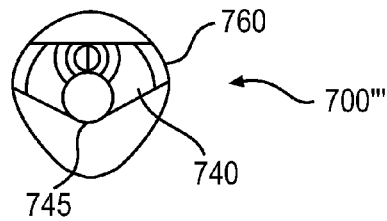
Figure 9A:
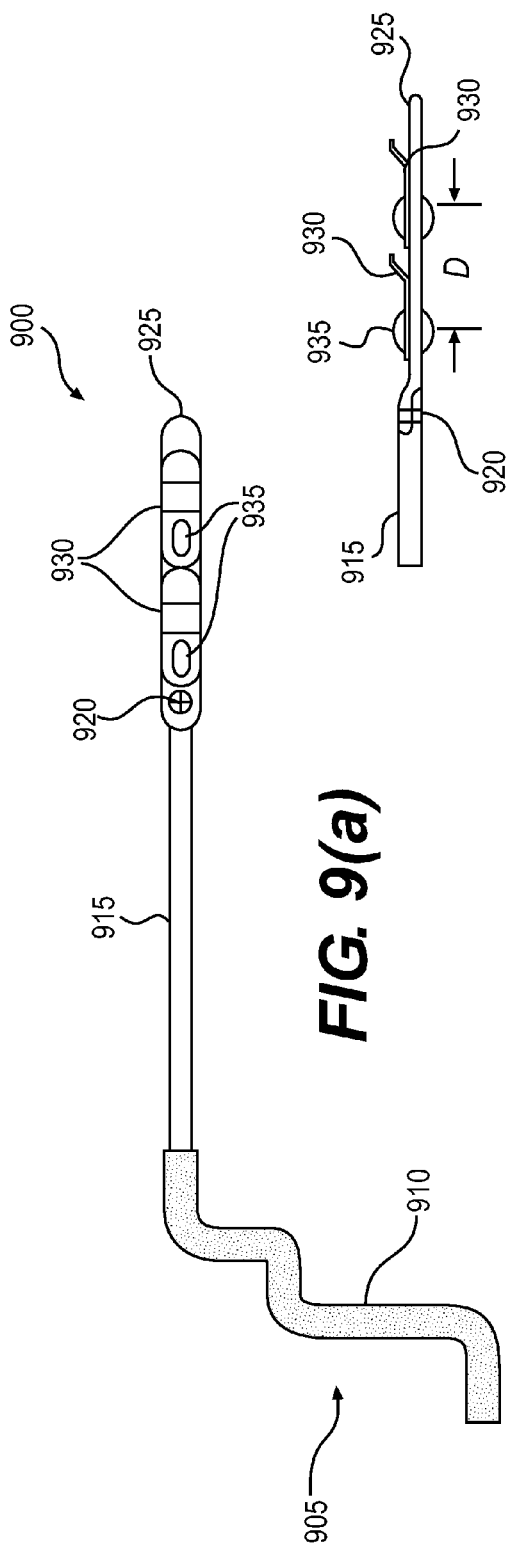
FIGS. 9(a)-9(d) illustrate an exemplary hidden hook remover in accordance with aspects of the disclosure.
Figure 9B:
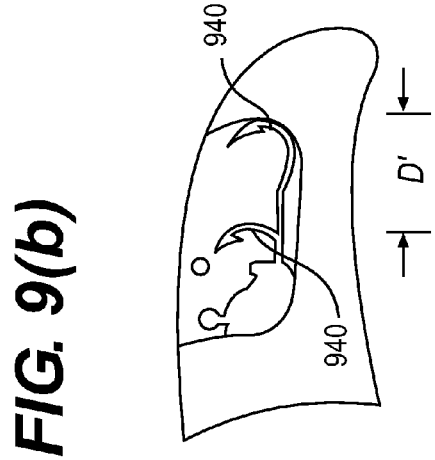
Figure 9C:
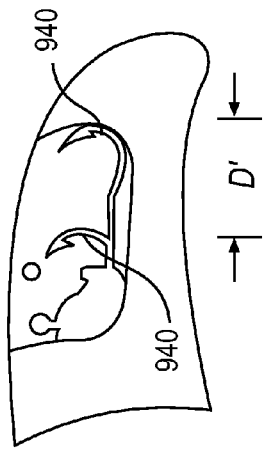
Figure 9D:
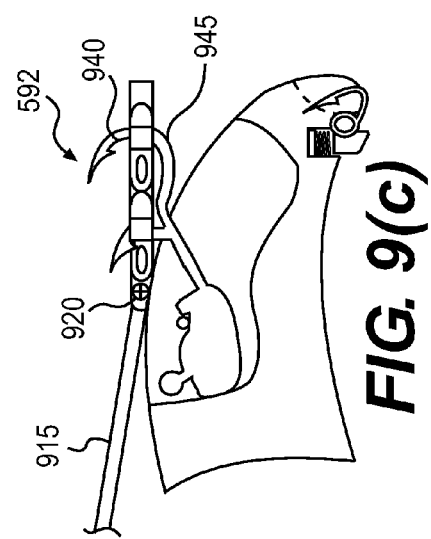

FIGS. 7(a)-7(d) illustrate side cutaway views and top cut away views of exemplary vertical pitch and flip type baits having a spherical striker 705 in accordance with aspects of the present disclosure. As shown in FIG. 7(a), in embodiments, the bait 700 may utilize a "wavy" flat spring 710 and a half frame sustain bar 715. As shown in FIG. 7(b), in embodiments, the bait 700' may utilize a coil spring 720 and a full frame sustain bar 725. As shown in FIG. 7(c), in embodiments, the bait 700" may utilize a straight flat spring 730 and a half frame sustain bar 715. As shown in FIG. 7(d), in embodiments, the bait 700''' may utilize a coil-in-coil spring configuration 735. FIG. 7(e) illustrates a front cutaway view of the bait 700''' having the coil-in-coil spring configuration 735. As shown in FIG. 7(e), in embodiments, the striker channel 740 may be structured as a "V" channel having a deeper central groove 745, which provides a clearance to allow the spring(s) to sustain their vibration without interference from the striker.

In operation, the lower frequency spring vibration is initiated by a user shaking the bait 700 side-to-side. Subsequently, the user pitches the bait 700 into the water and the bait begins to sink while the spring(s) continue to produce the lower frequency spring vibration (e.g., a "hum"). In accordance with aspects of the disclosure, as compared to the pendulum striker pitch-and-flip bait, the spherical striker pitch-and-flip bait allows for a simpler manufacturing process. For example, rather than the cutting apart, milling/drilling and reassembly, as may be used to provide the striker chamber of the pendulum striker assembly, with the spherical striker pitch-and-flip bait, 700 the striker chamber 740 (or 750), for example, is provided by boring or drilling a striker channel, and providing striker channel end covers 760 (or caps).

In accordance with further aspects of the disclosure, in embodiments, buzz bait rotation may be used to energize the spring(s). FIGS. 8(a)-8(g) illustrate various views of an exemplary rotationally-actuated spherical striker bait 800 in accordance with aspects of the disclosure. As shown in FIG. 8(*a*), in embodiments, the rotationally-actuated spherical striker bait 800 includes a front drum 805, having two spherical strikers 825 in respective striker channels 840 and two springs 820, and a rear body 810. As the rotationally-actuated spherical striker bait 800 is pulled through the water (e.g., during retrieve), the front drum 805 is structured and arranged to spin due to the blades 830 of rotor 833. As the front drum 805 rotates, the spherical strikers traverse the respective striker channels 840, due to gravity and/or centrifugal forces. The "spring tone" is energized by the vertical drop of the spherical striker of sufficient weight, as the holes go all the way across the front body, except the width of the hole caps. In accordance with aspects of the disclosure, the springs 820 are energized twice per 360 degree rotation of the front drum 805 so as to produce four (4) strikes per revolution of the front drum 805, thus producing, e.g., nearly constant tone or constant tone. In embodiments, the rear portion 810 of the lure 800 may remain relatively stationary except for the side-to-side "wiggle" caused by a front surface 835 of the rear portion 810 being concave. Additionally, an angler performing a rod tip cranking action may also facilitate the side-to-side "wiggle."

In embodiments, the striker passages 840 (i.e., the passages in which the spherical strikers move) may be transverse to the longitudinal axis of the lure 800 and parallel to one another, as shown in FIG. 8(*c*). This large "frontal rotation" type bait may be suitable for large fresh water and marine application. In accordance with aspects of the disclosure, the "rattle" or higher tone clicking sound produced by the spherical strikers 825 impacting the ends of the striker channels 840 (e.g., bait sides or end caps 845) and/or with one or more rattle chambers elsewhere on the bait body is combined with the lower frequency tones produced by the spring(s) vibration.

Additionally, in embodiments, the striker passages may be arced (for example on an arc with a center point on the lure longitudinal axis), which allows for a smaller lure housing and down scaling of the lure. Further, in embodiments, for example, as shown in FIGS. 8(*d*) and 8(*e*), one or more spherical strikers 825 within a circular channel 855 may activate the spring(s) 820. In embodiments, the rotationally-actuated spherical striker bait may include two springs (as shown, for example, in FIGS. 8(*d*) and 8(*e*)), or three springs (as shown, for example, in FIG. 8(*g*)), amongst other contemplated numbers of springs. FIG. 8(*f*) illustrates a side cutaway view of a lure having the circular channel 855 and two springs. In accordance with aspects of the disclosure, the circular channel 855 allows the lure to be retrieved very fast or very slowly, while still producing the combination of lower tones and higher tones. In accordance with aspects of the disclosure, however, the lure produces more noise, e.g., higher and/or lower frequency tones, with a faster retrieval. As shown in FIG. 8(*d*), in embodiments, the circular channel 855 may include a "scalloped" or wavy interior wall 850. In accordance with aspects of the disclosure, the higher frequency "rattle" may be produced by the spherical striker(s) 825 impacting or rolling over the "scalloped" or wavy interior wall 850. In accordance with aspects of the disclosure, the arrangement of the circular channel 855 and the spherical striker(s) 825 therein) should allow for sufficient clearance for the spherical striker(s) 825 to traverse the circular channel 855 (i.e., between the side wall and a center post 860) as the front drum 805 rotates. For example, the spherical striker may be sized so that it is operable to travel past the spring end and then clear the spring end, so that the spring is free to vibrate.

In accordance with aspects of the disclosure, as the front drum 805 rotates, centrifugal forces may tend to hold one or more spherical strikers 825 (e.g., a larger spherical striker) against an inner wall of the circular channel 855 to some extent. In embodiments, this causes the spring(s) 820 to vibrate as they travel past the one or more spherical strikers 825 (in contrast to the spherical strikers traveling past the spring(s) 820, e.g., due to gravity, as with the exemplary arrangement shown in FIG. 8(*c*)). In contrast, with the embodiment of FIG. 8(*c*), gravity is used to move the spherical striker 825. As such, in embodiments, the rotor 833 may be structured and arranged, for example, to produce less rotation or a lower rate of rotation (e.g., with a smaller number of blades 830 and/or smaller blades 830), so that the centrifugal forces acting on the spherical striker 825 due to rotation do not overcome the gravitational forces. Thus, in accordance with aspects of the disclosure, a lure can be retrieved quickly while still producing the lower frequency tone(s).

In embodiments, the circular channel 855 may be provided with a single spherical striker, for example, as shown in FIGS. 8(*d*) and 8(*e*). Additionally, for example, as shown in FIG. 8(*d*), in embodiments, the circular channel 855 may include one or more (e.g., two or three) smaller spheres 865, e.g., BBs and/or pieces of shot, therein. In accordance with aspects of the disclosure, as the front drum 805 rotates, the smaller spheres 865 impact (or bounce off of) the "scalloped" or wavy interior wall 850, the center post 860 and/or the other smaller spheres 865, to produce the higher frequency tone. In embodiments, the spherical striker(s) 825 and the smaller sphere(s) 865 may comprise the same materials, or different materials having different properties, for example, different densities, amongst other material properties.

As shown in FIGS. 8(*a*) and 8(*b*), in embodiments, the rotationally-actuated spherical striker bait 800 may also include a hidden hook system 590 and/or a removable trailer system 572 as described above. Further, as shown in FIG. 8(*a*), in embodiments, the rotationally-actuated spherical striker bait 800 may include one or more threaded inserts 870, to facilitate the addition of, for example, one or more extra hooks, e.g., treble style hook(s).

Additionally, as shown in FIG. 8(*a*), in embodiments, the rotationally-actuated spherical striker bait 800 may include one or more removable threaded collars 865 near the eye tie 867 to facilitate changing of a rotor 833 (e.g., to attach a different size and/or style rotor) to provide a customizable and/or tailorable lure, or to facilitate replacement of the rotor. As shown in FIGS. 8(*a*)-8(*g*), in disclosure contemplates the rotor 833 may have different configurations (e.g., 2, 3 or 4 blades, amongst other numbers of blades), different blade angles, and/or different materials (e.g., steel or aluminum), that may be suitable for differing applications.

A spanner 815 may be used to tighten and/or loosen the threaded collar(s) 865. In embodiments, the rotationally-actuated spherical striker bait 800 may also include a releasable connector 875 (e.g., a spring clip or a safety fastener) to facilitate a changing of the sections (e.g., the front drum 805 and/or the rear portion 810) to provide different configurations of the lure. For example, in accordance with aspects of the disclosure, the lure may be reconfigured to have a longer front drum and/or to include a front drum having a different striker/spring configuration (e.g., the different configurations of FIGS. 8(*c*) and 8(*d*)). Additionally, for example, the lure may be reconfigured to replace front drum 805 and rotor 833 of FIG. 8(*a*) with the front drum 805' of FIG. 8(*f*), which may be referred to as a boat prop style, as it resembles a trolling motor propeller.

In embodiments, the rotor 833 may be held in place with the assistance of grooves (not shown) provided in the front drum 805. In embodiments, the grooves may be provided by grooving the front drum 805 of the lure, and the buzz bait rotor 833 is subsequently embedded in (or attached to) the lure. Additionally, one or more threaded collars 865 and/or looped wire may be used to secure the rotor to the front drum 805.

In embodiments, as shown in FIG. 8(*a*), the rotationally-actuated spherical striker bait 800 may include one or more weights 880 to promote the landing of the bait in an upright position, so that the hidden hook system 590 remains retracted, for example, to prevent snags. Further, as shown in FIG. 8(*b*), in embodiments, the lure (e.g., the rear section 810) may include one or more rattle chambers 885.

In embodiments, the lure may comprise a material that sinks in water (e.g., is heavier than water). In accordance with aspects of the disclosure, the lure body may include wood (e.g., dense wood, such as, bodark (or osage orange)), or some other suitable material, such as, for example, epoxy, composite materials, or any other materials that can be added to softer plastic rigs or bottom bouncer rigs. In embodiments, the lure body may comprise bass wood, which provides several advantages. For example, bass wood is very suitable for drilling and milling, in that no or little roughness occurs when bass wood is drilled or milled. As such, further sanding or smoothing of the bass wood may not be necessary, which reduces costs for manufacture. Additionally, bass wood, when vibrated, does not produce many harmonics (or harmonic overtones). As such, when the spring tone is generated, e.g., at a particular frequency, the bass wood accurately transmits this particular frequency, without producing harmonic over tones.

In accordance with aspects of the disclosure, as the rotationally-actuated spherical striker bait 800 falls in the water column, the front drum 805 is structured and arranged to spin, thus producing the higher frequency tones and/or the lower frequency tones. Accordingly, the rotationally-actuated spherical striker bait 800 is suitable for virtually all sub-surface bait applications. Furthermore, while the strikers have been described as spherical strikers, it should be understood that the disclosure contemplates that, in embodiments, the strikers may not be "spherical," while still producing higher and/or lower frequency tones.

FIGS. 9(*a*)-9(*d*) illustrate an exemplary hidden hook remover 900 in accordance with aspects of the disclosure. In embodiments, removal of the hidden hook system (e.g., from a fish's mouth) may require a specialized hook remover. That is, as the hidden hook(s) system employs, for example, two hooks in tandem on a pivoting pendulum, a specially designated tandem hook remover may be necessary to remove the hook from a fish's mouth. For example, if both hooks are deeply embedded in the roof of a fish's mouth and/or upper lip(s), a conventional hook remover would not be able to remove the hook(s) without damaging the fish, breaking off the hooks, and/or bending the hook shafts. Moreover, breaking off the hooks, and/or bending the hook shafts may prevent proper operation of the hidden hook system.

With the exemplary hidden hook remover 900 of the present disclosure, however, a user is able to grip and remove the hook(s) of the hidden hook system without damaging the fish, breaking off the hooks or bending the hook shafts. Additionally, the exemplary hidden hook remover 900 allows a fisher to remove the hook(s) of the hidden hook system notwithstanding a reduction of leverage (described above), due to the tandem hook-behind-hook arrangement.

As shown in FIG. 9(*a*), in embodiments, the hidden hook remover 900 comprises an ergonomically designed handle 905 structured and arranged to provide additional leverage. In embodiments, the handle 905 may include a covering 910 (e.g., comprising plastic coating or other suitable material), which aids in providing a more secure griping surface, for example, to help counteract wet and/or slimy hands. The exemplary hidden hook remover 900 also includes a main body 915 and a head 925. The main body 915 is appropriately sized so that it is: sufficiently long to reach into, for example, a large fish; and sufficiently thin in profile for clearance (as the lure will often be tight against the fish's mouth). The head 925 is flattened, for example, to approximately ¼" wide, to increase leverage over the hooks and to incorporate wider and/or stronger clips (described below).

The hidden hook remover 900 also may include an adjustable angle point 920 (e.g., a pivot) between the main body 915 and the head 925 to provide for right-handed or left-handed use. Also, in embodiments, the mating surfaces (not shown) between the main body 915 and the head 925 may be roughened, grooved, cross-hatched, etc. to provide increased friction between the mating surfaces. In embodiments, the hidden hook remover 900 is easily scaled up or down.

Additionally, as shown in FIGS. 9(*a*) and 9(*b*), in embodiments, the hidden hook remover 900 includes two spring clips 930 fastened to the head 925 by respective rivets 935. As shown in FIGS. 9(*b*) and 9(*c*), in embodiments, the unsecured ends of the spring clips 930 may have a portion protruding (e.g., bent) away from the head 925 to facilitate the hook(s) sliding under the spring clips 930. The spring clips 930 should be strong enough to provide for adequate leverage.

Additionally, as shown in FIGS. 9(*b*) and 9(*d*), in accordance with aspects of the disclosure, the throat or back of the two spring clips 930 are spaced from one another a distance D (e.g., ¾") approximately equal to the distance D' between the backs of the respective hook bends 940 of the hook shafts 945. In embodiments, the hook removal system may be implemented with standardized sizes to match the hooks of the inertia hidden hook system. (e.g., a #2 hook remover to correspond with a bait (or lure) having a #2 hidden hook system).

In embodiments, the rivets 935 may be elongated in cross section (e.g., not circular) so as to prevent the spring clips 930 from rotating/twisting/pivoting on the head 925, which provides a strong grip on the hooks, although the disclosure contemplates circular rivets. Circular rivets may be easier to implement due to drill bits being round. Elongated rivets, however, may be easier to implement if formed using punch press.

In accordance with aspects of the disclosure, in operation, the head 925 is inserted into the fish's mouth and then shoved forward to "snap" the spring clips 930 over the hook shafts 945 at the back of the hook bends 940, as shown in FIG. 9(*c*). Once the hook shafts 945 are secured in the spring clips 930, the user pushes the head 925 forward (i.e., further into the fish's mouth) and downward and twists (e.g., slightly) to disengage the hooks from the fish's mouth. Once the hooks are removed from the fish's mouth, the user can disengage the hidden hook remover 900 from the spring clips 930, and the hooks 592 will revert to their hidden position within the bait body, as shown in FIG. 9(*d*).

Additionally, in embodiments, the hidden hook remover 900 is structured and arranged to easily add additional hook clips 930 thereto. That is, while the exemplary hidden hook remover 900 is configured to remove a hidden hook system having two hooks, the disclosure contemplates a hidden hook system having more than two hooks, in which case the hidden hook remover would have a corresponding number of spring clips 930 (and rivets 935).

Figure 10A:
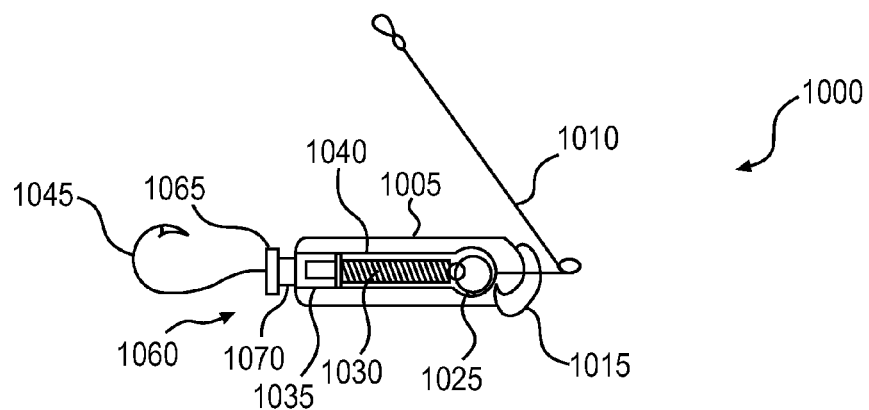
FIGS. 10(a)-10(d) illustrate various views of an exemplary offset spinner bait in accordance with aspects of the disclosure.

FIGS. 10(a)-10(d) illustrate various views of an exemplary offset spinner bait 1000 in accordance with aspects of the disclosure. FIG. 10(a) illustrates a side cut-away view of an exemplary offset spinner bait 1000. In embodiments, the bait body 1005 may comprise a sinking material, such as, for example a heavier-than-water wood (e.g., bodark, osage orange and/or hedge). As shown in FIG. 10(a), in embodiments, the offset spinner bait 1000 includes a stiff wire harness 1010. In embodiments, the harness 1010 may be, for example, molded to the bait body 1005, or glued in a hole drilled in the bait body 1005. The harness 1010 serves as the line tie as well as the mount for spinner blades (not shown).

In accordance with aspects of the disclosure, the exemplary offset spinner bait 1000 also includes a wobble bill 1015, which is structured and arranged to induce a side-to-side motion to the lure body 1005 and the sphere striker 1025 arranged therein, to energize the spring device 1030. As shown in FIG. 10(a), a mounting dowel 1035, which is structured and arranged to support the spring device 1030 in position, is secured within a bore in 1040 the bait body 1005. In embodiments, a skirt base 1060 is, for example, attached to (or integral with) the mounting dowel 1035. In embodiments, the skirt base 1060 includes a ridged surface 1065 and an inner portion 1070. The mounting dowel 1035 also holds a hook 1045. In embodiments, mounting dowel 1035 may comprise, for example, epoxy, wood and/or metal. The hook 1045 may be molded into the mounting dowel 1035, or glued into a hole bored in the mounting dowel 1035.

Figure 10B:
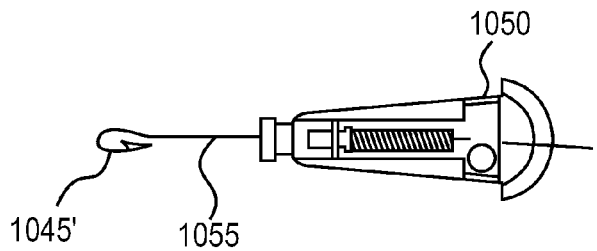
Figure 10C:
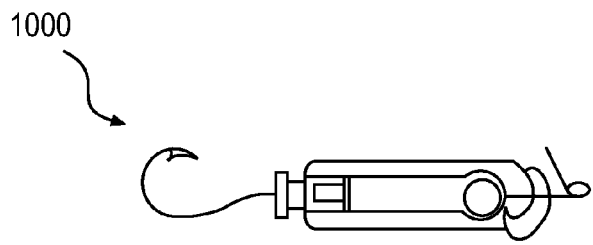
Figure 10D:
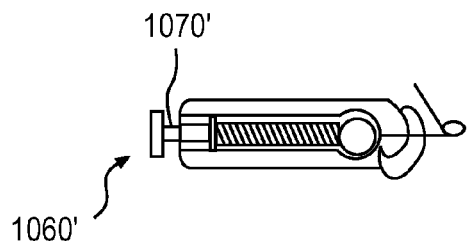

FIG. 10(b) illustrates a top cut-away view of the exemplary offset spinner bait 1000 in accordance with aspects of the disclosure. As shown in FIG. 10(b), the offset spinner bait 1000 includes end caps 1050, in accordance with aspects of the disclosure, as discussed above. Also, as shown in FIG. 10(b), in embodiments, the offset spinner bait 1000 may include a hook 1045' having a longer shank 1055. FIG. 10(c) illustrates a side cut-away view of the exemplary offset spinner bait 1000 without a spring and end caps. FIG. 10(d) illustrates a side cut-away view of the exemplary offset spinner bait 1000 without a hook. Also, as shown in FIG. 10(d), in embodiments, the offset spinner bait 1000 may include an alternative skirt base 1060' having an inner portion 1070' with a smaller diameter.

Figure 11:
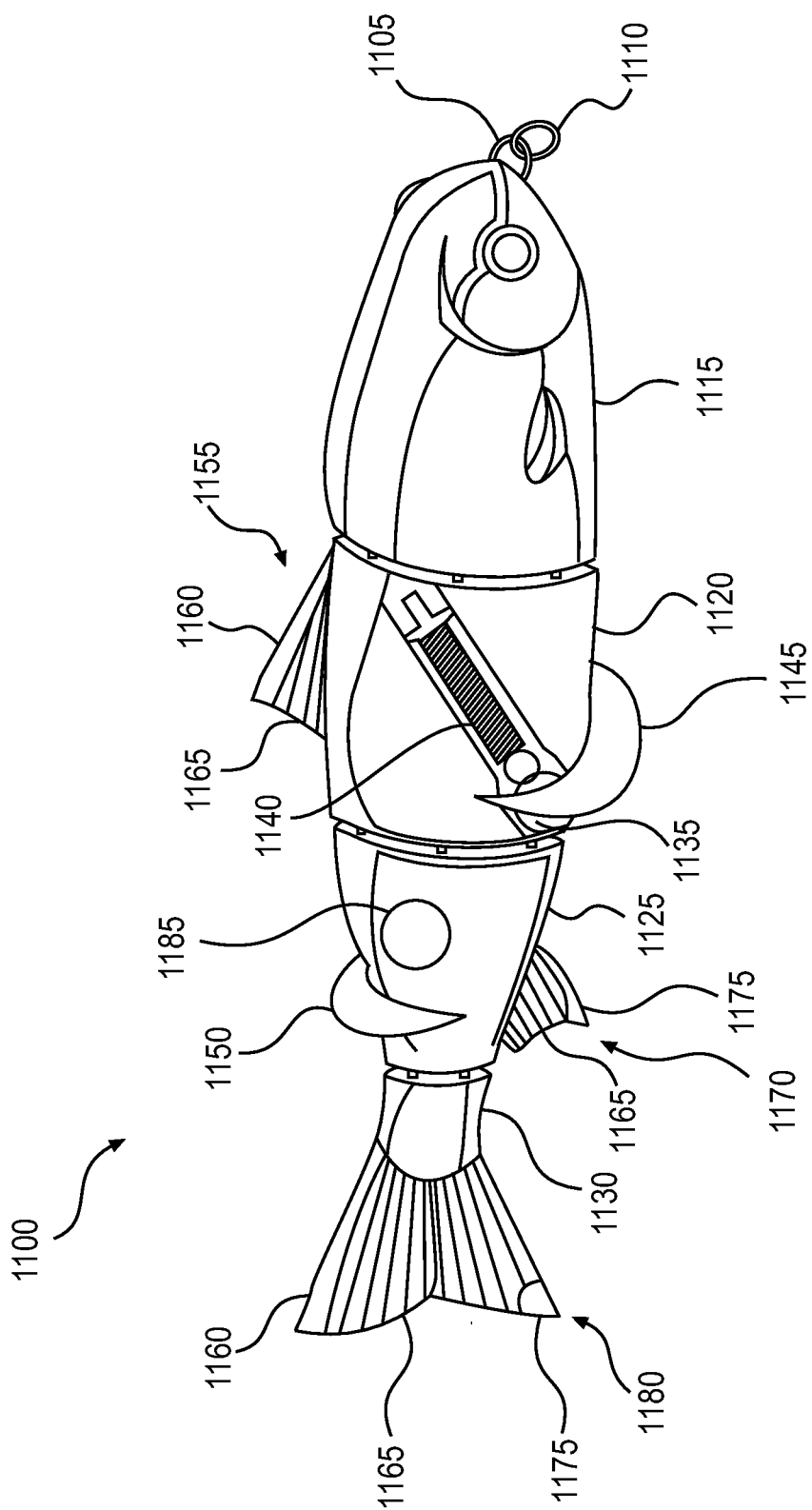
FIG. 11 illustrates an exemplary jointed undulating bait having a higher body length-to-height ratio in accordance with aspects of the disclosure.

FIG. 11 illustrates an exemplary jointed undulating bait 1100 having a higher body length-to-height ratio in accordance with aspects of the disclosure. As shown in FIG. 11, in embodiments, the exemplary jointed undulating bait 1100 is designed as a northern (e.g., colder water) bait fish, such as, for example, alewives, ciscoes, skip jacks and/or chubs, amongst other northern (e.g., colder water) bait fish. The exemplary jointed undulating bait 1100 includes a line tie 1105 (shown with attached snap ring 1110). In embodiments, the jointed undulating bait 1100 includes a front body section 1115, a front-middle body section 1120, a rear-middle body section 1125 and a rear body section 1130. As shown in FIG. 11, with this exemplary embodiment, the front-middle body section 1120 houses the spherical striker 1135 and the spring system 1140. In embodiments, as illustrated in FIG. 11, the spherical striker 1135 and the spring system 1140 may be oriented such that the spherical striker 1135 is rearward relative to the spring system 1140 (e.g., reversed). In embodiments, the front-middle body section 1120 includes a wobble bill 1145 mounted, for example, on the rear bottom thereof. In accordance with aspects of the disclosure, the wobble bill 1145 is structured and arranged to induce a side-to-side, undulating motion to the bait 1100. The side-to-side, undulating motion causes the spherical striker to energize the spring system 1140 and impact end caps (not shown), thus producing the combination of lower frequency and higher frequency tones. Additionally, in embodiments, the jointed undulating bait 1100 may include a rattle chamber 1185 to produce additional higher frequency "clicking" tones.

In operation, in accordance with aspects of the disclosure, the jointed undulating bait 1100 is raised up and down through manipulation of the rod tip. In accordance with aspects of the disclosure, in embodiments, the rear-middle body section 1125 includes a stabilizer bill 1150, which may be structured and arranged to counter any down-pull or lift of the wobble bill 1145 to, for example, prevent the bait from traveling in a nose-up or nose-down attitude. Additionally, the stabilizer bill 1150 facilitates the undulating, swimming effect of the rearward body sections of the bait 1100. During a steady retrieve, the stabilizer bill 1150 assists in maintaining the jointed undulating bait 1100 at a constant depth. In embodiments, the stabilizer bill 1150 may be smaller than the wobble bill 1145, for example, because of a leverage increase due to the stabilizer bill 1150 being arranged further from the attachment point (e.g., line tie 1105).

As additionally shown in FIG. 11, in accordance with further aspects of the disclosure, in embodiments, the jointed undulating bait 1100 includes a dorsal fin 1155, a ventral fin 1170 and/or a tail fin 1180. In embodiments, the dorsal fin 1155 may be attached to the front-middle body section 1120. The dorsal fin 1155 may include a stiffening member 1160, for example, a hollow, air-filled column (e.g., a straw-shaped material) of sufficient strength and durability. Additionally the dorsal fin 1155 includes a pliable material 1165 (e.g., a billowing material), which, in embodiments, may be structured and arranged to lay flat against the lure body front-middle section 1120 (e.g., when not in use). In embodiments, the ventral fin 1170 may be attached to the rear-middle body section 1125. In embodiments, the ventral fin 1165 may include the pliable material 1165 (e.g., a billowing material) and a weight 1175, for example, arranged therein. The tail fin 1180 includes the pliable material 1165, a weight 1175 and a stiffening member 1160. In accordance with aspects of the disclosure, the weights 1175 are structured and arranged to spread the tail fin 1180 and ventral fin 1170 when submerged. Additionally, the dorsal fin 1155, the ventral fin 1170 and the tail fin 1180 are structured and arranged to allow for vertical and side-to-side (or lateral) movement, which gives a life-like, swimming, flexing appearance to the bait 1100.

Figure 12:
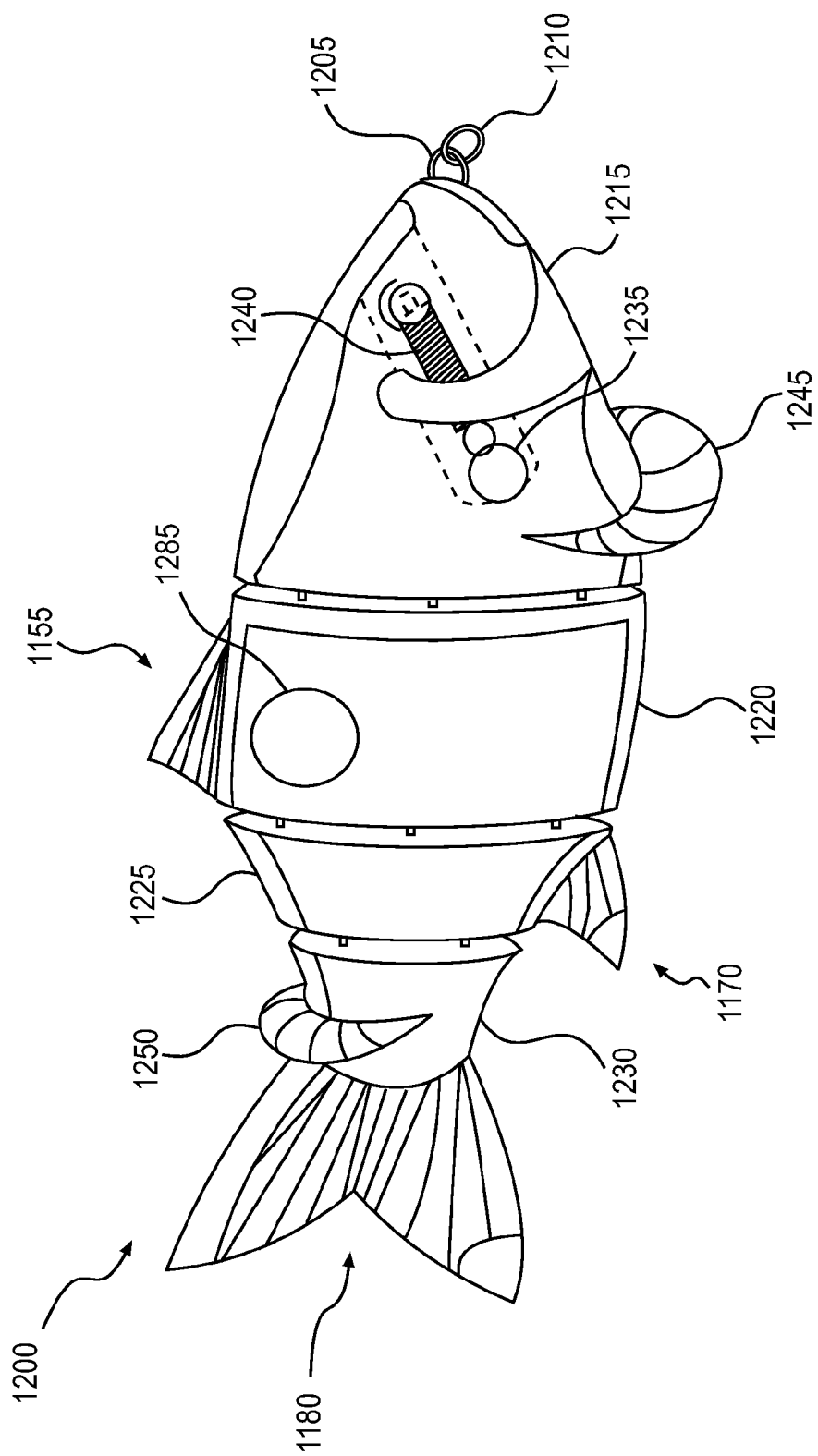
FIG. 12 illustrates an exemplary jointed undulating bait having a lower body length-to-height ratio in accordance with aspects of the disclosure.

FIG. 12 illustrates an exemplary jointed undulating bait 1200 having a lower body length-to-height ratio in accordance with aspects of the disclosure. The exemplary jointed undulating bait 1200 operates in a similar manner to the exemplary jointed undulating bait 1100. As shown in FIG. 12, in embodiments, the exemplary jointed undulating bait 1200 is designed as a southern (e.g., warmer water) bait fish, such as, for example, shad, sunfish and/or crappie, amongst other southern (e.g., warmer water) bait fish. The exemplary jointed undulating bait 1200 includes a line tie 1205 (shown with attached snap ring 1210). In embodiments, the jointed undulating bait 1200 includes a front body section 1215, a front-middle body section 1220, a rear-middle body section 1225 and a rear body section 1230. As shown in FIG. 12, with this exemplary embodiment, the front body section 1215 houses the spherical striker 1235 and the spring system 1240. In embodiments, as illustrated in FIG. 12, spherical striker 1235 and the spring system 1240 are oriented such that the spherical striker 1235 is rearward relative to the spring system 1240. Additionally, in embodiments, the jointed undulating bait 1200 includes a rattle chamber 1285.

As shown in FIG. 12, in embodiments, the front body section 1215 includes a wobble bill 1245 mounted, for example, on the rear bottom thereof, which induces a side-to-side, undulating motion to the bait 1200 to energize the spring system 1240. Additionally, the rear body section 1230 includes a stabilizer bill 1250, for example on the upper side thereof, which may be structured and arranged to counter any down-pull or lift of the wobble bill 1245. Further, as shown in FIG. 12, in embodiments, the jointed undulating bait 1200 includes a dorsal fin 1155, a ventral fin 1170 and/or a tail fin 1180.

Figure 13A:
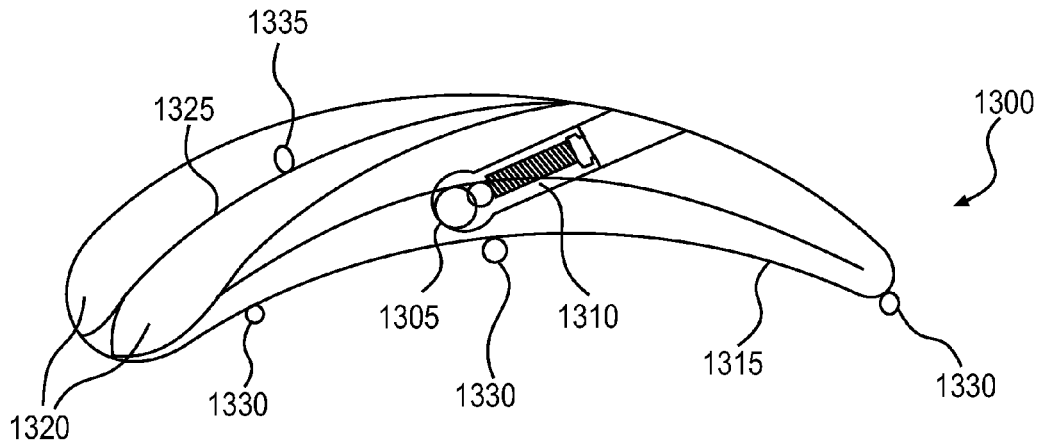
FIGS. 13(a)-13(d) illustrates various views of an exemplary flat-fish style crank bait having a spherical striker and coil spring system in accordance with aspects of the disclosure.
Figure 13B:
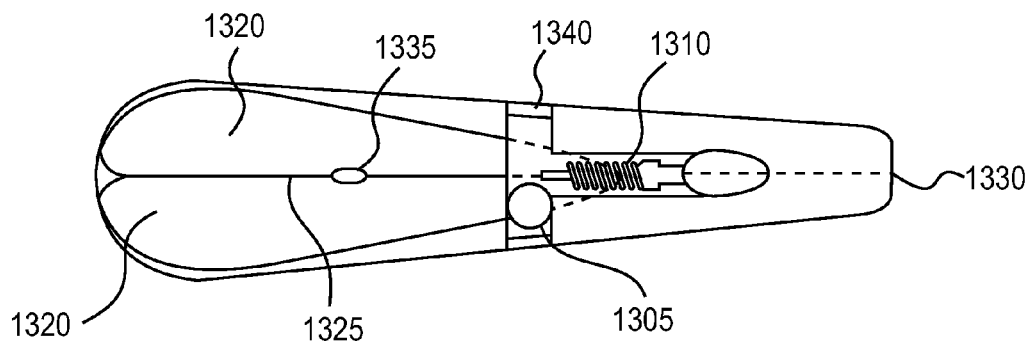
Figure 13C:
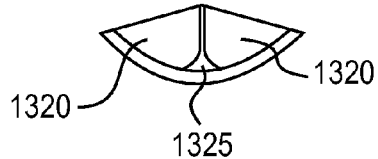
Figure 13D:
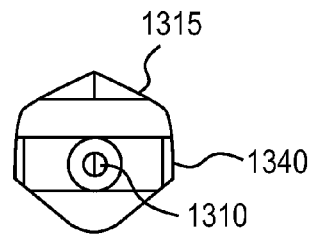

FIGS. 13(a)-13(d) illustrate various views of an exemplary flat-fish style crank bait 1300 having a spherical striker 1305 and coil spring system 1310 in accordance with aspects of the disclosure. FIGS. 13(a) and 13(b) illustrate side and top partial cut-away views, respectively, of the exemplary flat-fish style crank bait 1300 in accordance with aspects of the disclosure. FIGS. 13(c) and 13(d) illustrate two sectional views of the exemplary flat-fish style crank bait 1300 in accordance with aspects of the disclosure. The flat-fish style crank bait 1300 may have a bait body 1315 with buoyant properties for shallow water applications, or with sinking properties for deeper water applications.

In accordance with aspects of the disclosure, the flat-fish style crank bait 1300 is designed to produce a pronounced, rapid, side-to-side action, and is very versatile for a large array of both fresh water and marine applications. As shown in FIGS. 13(a) and 13(c), the front end of the bait includes flattened and/or scalloped regions 1320 and intermediate apex 1325, which help produce the pronounced, rapid, side-to-side action. The flat-fish style crank bait 1300 also includes three hook attachment eyes 1330 and an eye tie 1335. As shown in FIGS. 13(a) and 13(d), the flat-fish style crank bait 1300 also includes end caps 1340.

FIG. 14(a) illustrates an exemplary surface wobble bait 1400 with a removable buzz bait 1455 having a spherical striker 1405, coil spring system 1410, inertia hidden hook system 1415 and trailer hook system 1420 in accordance with aspects of the disclosure. The exemplary surface wobble bait 1400 is configured to float using buoyant materials in accordance with aspects of the disclosure. The removable buzz bait 1455 is attached to the front end of the bait 1400 and may be selectively detached therefrom. As shown in FIG. 14(a), the surface wobble bait 1400 includes a "cupped" front bill device 1425, which is structured and arranged to produce a side-to-side action for the bait body 1435. In embodiments, the front bill device 1425 resembles a dirt blade-type bulldozer blade, with an outside edge 1440 set at an angle of approximately 45 degrees from the longitudinal axis of the bait body 1435. Additionally, the outside "corners" of the buzz bait 1440 are structured and arranged to be lower or deeper in the water column than the front edge 1430. As shown in FIG. 14(a), in embodiments, the bill device 1425 may be angled slightly top forward, which helps to the keep the bill device 1425 from snagging on and/or gathering debris. In further embodiments, the front bill device 1425 may be similar to an Arbogast JITTERBUG® style bill.

As shown in FIG. 14(a), the bill device 1425 also includes two attachment eyes. A center-mounted attachment eye 1445, may be, for example, vertically and/or laterally center-mounted on the front bill device 1425. A top-mounted attachment eye 1450 is mounted to the top of the front bill device 1425. In accordance with aspects of the disclosure, top-mounted attachment eye 1450 may be used when the bait 1400 is tied directly to the fishing line (e.g., when not using the removable buzz bait system 1455) to facilitate the side-to-side action of the bait 1400. In embodiments, the top-mounted attachment eye 1450 is structured and arranged to pivot with some "free" play to help prevent hang-ups and to facilitate the side-to-side action of the bait 1400. For example, as shown in FIG. 14(b), the top-mounted attachment eye 1450 may comprise a rivet or eyelet with a "T" attachment in a recess with sufficient clearance to facilitate the "free" play.

As shown in FIG. 14(a), the exemplary surface wobble bait 1400 includes weights 1460 and recessed threaded inserts 1465. In accordance with aspects of the disclosure, the weights 1460 are structured and arranged, for example, to assist the bait's travel in flight, as well as landing upright and remaining upright in the water. The threaded inserts 1465 may be used, for example, to mount treble hooks (not shown), which may be suitable if using the bait in open water (e.g., where being weedless is of less concern). Using treble hooks may result in a much higher bite or strike to hook-up ratio.

Figure 15A:
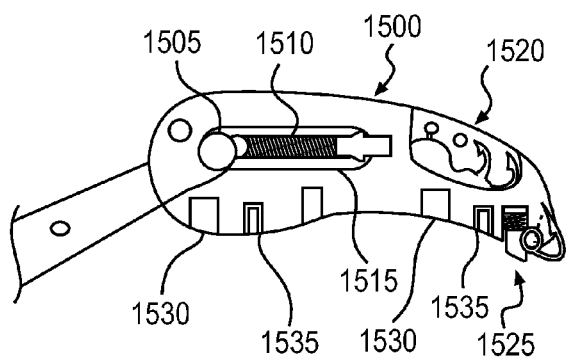
FIGS. 15(a)-15(e) illustrate various views of an exemplary crank bait having a spherical striker and two coil springs separately arranged in respective spring coil channels in accordance with aspects of the disclosure.
Figure 15B:
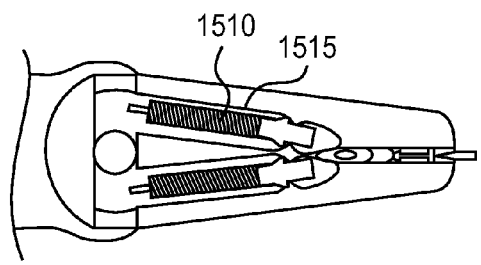
Figure 15C:
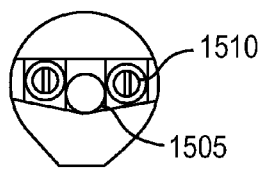
Figure 15D:
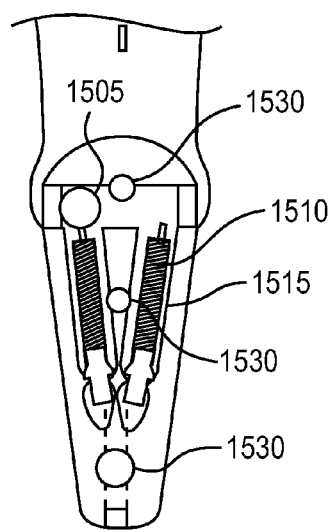
Figure 15E:
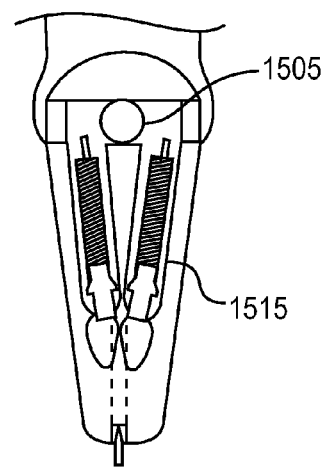

FIGS. 15(a)-15(e) illustrate various views of an exemplary crank bait 1500 having a spherical striker 1505 and two coil springs 1510 separately arranged in respective spring coil channels 1515, as well an inertia hidden hook system 1520 and trailer hook system 1525 in accordance with aspects of the disclosure. FIGS. 15(a), 15(b), and 15(c) illustrate a side cut-away view, a top cut-away view and a sectional view, respectively, of the exemplary crank bait 1500. FIGS. 15(d) and 15(e) illustrate bottom cut-away views of the crank bait 1500 showing the spherical striker 1505 in contact with an end of a coil spring 1515 and situated between the ends of the spring coils 1515, respectively. In accordance with aspects of the disclosure, the multiple spring arrangement produce a more constant tone, and facilitate the pause, sporadic, and/or stop and go retrieve. As shown in FIG. 15(a), in accordance with aspects of the disclosure, the crank bait 1500 includes one or more weights 1530 to provide negative buoyancy to prevent the lure from floating upward during a pause in retrieve, which is effective when the lure is used as a sporadic lure. Additionally, in embodiments, the crank bait 1500 may include one or more recessed threaded inserts 1535, discussed above.

In-Line, Removable, Buzz Bait with Surface Ski

FIGS. 16(a)-16(e) illustrate various views of a customizable buzz bait system 1600 in accordance with aspects of the disclosure. As the buzz bait system 1600 travels across the surface of the water, in embodiments, the bait may imitate a terrestrial animal or a bird (e.g., that has fallen in the water). In accordance with aspects of the disclosure, in embodiments, the customizable buzz bait system 1600 incorporates a surface ski 1625 to hold whatever is behind it up. This enables a fisherman to basically convert any jerk bait, shallow crank bait, surface creature lures (e.g., Grass Frogs®, weedless mice, etc.), Johnson's Silver Minnow® (with a large worm), stick baits (Zara Spook®-type baits), poppers, or just a worm hook with a soft plastic bait of any configuration into a wobbling buzz bait lure that will stay on top of the water. In operation, the lift of the surface ski 1625 overcomes the pull of the small lip on a jerk bait or a shallow diving crank bait, then the energy transfers to a wobble motion.

Figure 16A:
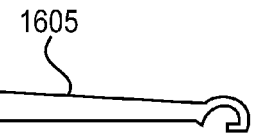
FIGS. 16(a)-16(e) illustrate various views of a customizable buzz bait system in accordance with aspects of the disclosure.
Figure 16B:
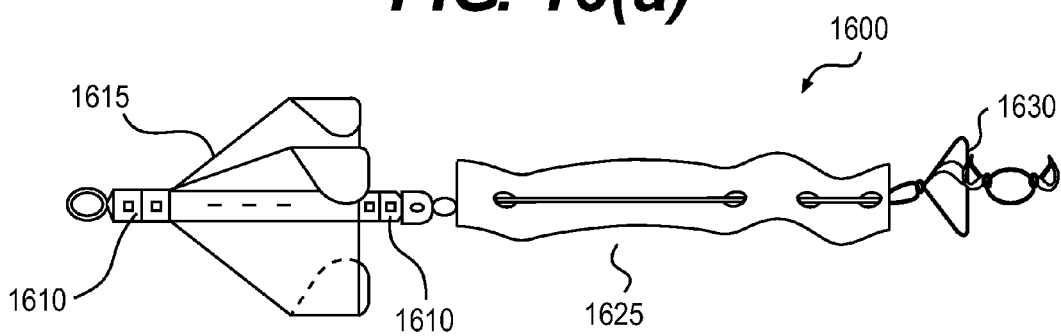
Figure 16C:
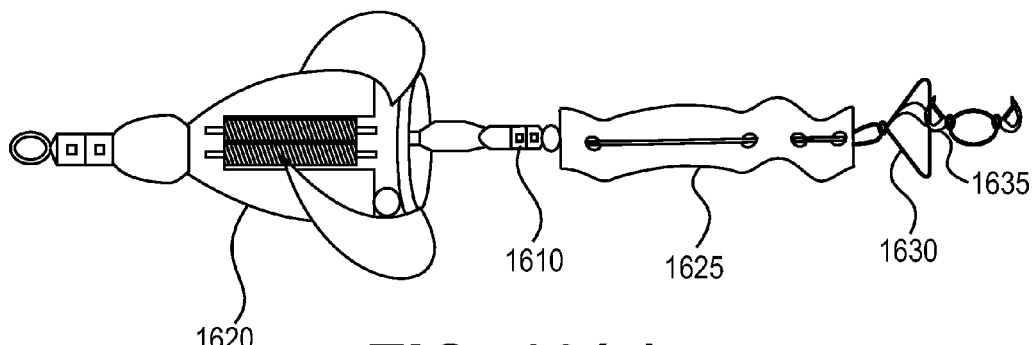
Figure 16D:
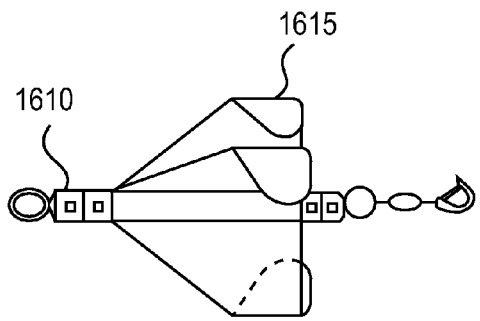
Figure 16E:
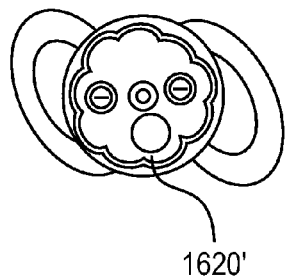

FIG. 16(a) illustrates a spanner 1605, which may be used to tighten and/or loosen threaded collars 1610, to change, replace, add and/or remove various components of the customizable buzz bait system 1600. In accordance with aspects of the disclosure, the customizable buzz bait system 1600 allows a user to add, for example, a buzz bait 1615, as shown in FIGS. 16(b) and 16(d), or a surface bait employing a coil spring rotor system 1620, as shown in FIG. 16(c) to other existing bait components an angler already possesses. Additionally, using threaded collars 1610 allows a user to easily configure a lure with, for example, surface skis 1625 having various sizes, as shown in FIGS. 16(b) and 16(c), and/or coil spring rotor systems 1620, 1620' having various designs, as shown in FIGS. 16(c) and 16(e). The buzz bait system 1600 also includes a wobble device (or triangle) 1630, which is structured and arranged to provide side-to-side motion to components attached behind the wobble device 1630. For example, the wobble device 1630 allows the side-to-side movement that is created by a diving bill on jerk baits, shallow diving crank baits, or poppers, when the diving bill is over-ridden by a surface ski 1625. In other words, the surface ski 1625 is structured and arranged to overpower the small bill on a shallow diver, a jerk bait or lipless crank bait, but the energy has to go somewhere. Thus, the wobble device 1630 is structured and arranged to harness the energy to create a very "fish enticing" wobble that virtually mimics the action of large, very expensive jointed baits. In accordance with aspects of the disclosure, using a surface ski 1625, for example, with a coil spring rotor system 1620, as shown in FIG. 16(c), may allow for a slow retrieve, while still producing substantial low frequency and high frequency tones.

FIG. 16(b) illustrates a buzz bait 1600 with a surface ski 1625 (e.g., a large sized surface ski) and a "non-toned" rotor head 1615 in accordance with aspects of the disclosure. In embodiments, this configuration may be suitable with a large shallow-diving crank bait (e.g., having a low frequency tone generation device) or a heavy lure, amongst other lures.

FIG. 16(c) illustrates a buzz bait 1600 with a surface ski 1625 (e.g., a smaller-sized surface ski) and a floating "toned" rotor head 1620 in accordance with aspects of the disclosure. Additionally, as shown in FIG. 16(c), this bait configuration includes a non-removable wobble device 1630 and clip 1635, as indicated by the absence of threaded collars. The clip 1635 is structured and arranged to secure the wobble device and provide an attachment point for lures. In embodiments, the clip 1635 is structured and arranged with sufficient strength to hold the wobble device centered when a non-wobbling lure (e.g., a plastic worm) is attached thereto, but to allow for the wobbling when a wobbling lure is attached to the clip 1635. In accordance with aspects of the disclosure, by providing the clip 1635 with sufficient strength to hold the wobble device centered when a non-wobbling lure (e.g., a plastic worm) is attached thereto, the weedlessness of the bait can be improved. In embodiments, this configuration may be suitable for a myriad of applications, for example, in combination with "non-toned" existing tackle, including soft plastics, jigs, grass frogs and/or jerk baits.

FIG. 16(d) illustrates a buzz bait 1600 with a surface ski omitted in accordance with aspects of the disclosure. In embodiments, this allows an angler to covert virtually any bait or component into a fast retrieve surface bait. While often longer profile buzz-type baits tend to be successful, sometimes providing a bait with a shorter profile may be advantageous.

Elastic-Based Acoustical Device

FIGS. 17(a)-17(c) illustrate various views of an elastic tone generation device 1700 in accordance with aspects of the disclosure. The elastic tone generation device 1700 is based on similar principles as the spring tone generation devices discussed above. As illustrated in FIG. 17(a), an elastic band 1705 may be arranged on a mounting element 1710 that includes, for example a single prong end 1715 and a double prong end 1720. As shown in FIG. 17(a), in embodiments, the elastic band 1705 may comprise a flat material (e.g., having a flat cross section, such as, a flat rubber band). In accordance with aspects of the disclosure, the elastic material 1705 is arranged about both the single prong end 1715 and the double prong end 1720 in tension. In a manner similar to the previously discussed embodiments, a pendulum striker 1725 is arranged to strum the elastic band 1705 to produce the lower frequency tone.

The spring tone generation device and the elastic tone generation device both work on low frequency vibration; however, the way that the pendulum "energizes" may be different. With the previous "harp" style the pendulum "struck" free spring end. With the elastic tone generation device 1700, for example, the pendulum striker 1725 is structured and arranged to "pluck" or strum the elastic band 1705. Additionally, while paused (e.g., not retrieving), this embodiment may not generate a tone, which may be advantageous in some situations.

In embodiments, the elastic material may include any type of elastic material (e.g., rubber bands, elastic such as used in clothing, strips from a bicycle inner tube (e.g., thin strips), or nylon fishing line, etc.). For example, any material that can be stretched to be struck or rubbed to create a tone may be used.

In embodiments, the mounting element 1710 may be, for example, mounted in a hole provided in the bait body. FIG. 17(b) illustrates the mounting element 1710 without an elastic material 1705 arranged thereon. As shown in FIG. 17(b), the mounting prongs 1730 of the double prong end 1720 are spaced from one another to facilitate the side-to-side motion of the pendulum strumming each side of the elastic band 1705. In accordance with aspects of the disclosure, this multiple strumming of the elastic band 1705 provides a more constant lower frequency tone. Additionally, as shown in FIG. 17(b), in embodiments, each mounting prong 1730 may include one or more retaining members 1735 to aid in retaining the elastic band 1705 on the mounting prongs 1730.

FIG. 17(c) illustrates an elastic tone generation device 1700' having an elastic band 1705' comprising a round cross section material in accordance with further aspects of the disclosure. In embodiments, the an elastic band 1705' having a round cross section may include, for example, an o-ring, a nylon string, and/or elastic from clothing. As shown in FIG. 17(c), with an elastic band 1705' comprise a round cross section material, the mounting prongs 1730 on the double prong end 1720 may be spaced more closely together, as compared to the embodiment shown in FIG. 17(a).

Weight-on-Shaft Striker

In additional embodiments, a weight-on-shaft striker may be used in accordance with aspects of the disclosure. With the weight-on-shaft striker embodiment, a weighted element (e.g., having a tear drop shape) having an upper end with a hole (or guide eye) is arranged to move back and forth on a shaft (or rod) that is arranged transverse to the longitudinal axis of the lure. A small hole over a large hole that uses a "guide eye," shafted, above a cylindrical type weight as a spring activation system. It should be understood that other weight shapes are contemplated by the disclosure.

It is noted that the foregoing examples have been provided merely for the purpose of explanation and are in no way to be construed as limiting of the present disclosure. While the present disclosure has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A fishing lure comprising:
an inertially-activated pivotable hook system comprising
a pivotable hook assembly structured and arranged to be pivotable between an un-deployed position and a deployed position, wherein the pivotable hook assembly comprises:
a pendulum mass attached to the lure,
a pivot around which the pendulum mass is pivotable; and
at least one hook attached to the pendulum mass; and
a cavity structured and arranged to accommodate the pivotable hook assembly in the un-deployed position,
wherein the pendulum mass is structured and arranged to maintain the pivotable hook assembly in the un-deployed position by gravity acting on the pendulum mass attached to the hook until a sufficient inertial force is received by the pivotable hook assembly,
wherein upon receiving the sufficient inertial force, the pivotable hook assembly momentarily pivots towards the deployed position to expose the at least one hook outside the lure.

2. The fishing lure of claim 1, wherein when in the un-deployed position the pivotable hook assembly is positioned such that the at least one hook is recessed within the lure.

3. The fishing lure of claim 1, wherein when in the deployed position the pivotable hook assembly is positioned such that the at least one hook is exposed outside the lure.

4. The fishing lure of claim 1, wherein the pivotable hook assembly is structured and arranged to:
move from the un-deployed position to the deployed position upon the pivotable hook assembly receiving a sufficient inertial force; and
move from the deployed position to the un-deployed position upon a subsiding of the sufficient inertial force.

5. A method of using the fishing lure of claim 1, the method comprising:
pulling a line attached to the fishing lure to provide an inertial force to the pivotable hook assembly to move the pivotable hook assembly from an un-deployed position, in which a hook of the pivotable hook assembly is recessed within the fishing lure, to a deployed position, in which the hook of the pivotable hook assembly is exposed outside the fishing lure.

6. The fishing lure of claim 1, wherein the pivotable hook assembly comprises a plurality of hooks.

7. The fishing lure of claim 6, wherein the plurality of hooks comprises two hooks in a hook-behind-hook arrangement, the hook-behind-hook arrangement comprising a frontward hook and a rearward hook, and when the pivotable hook assembly is in a deployed position, the rearward hook is above the frontward hook.

8. The fishing lure of claim 1, wherein the pivotable hook assembly further comprises a connection portion arranged between the pivot and the pendulum mass, and connecting the pivot to the pendulum mass.

9. The fishing lure of claim 8, wherein the connection portion is structured and arranged to provide range of motion and/or balance to the pivotable hook system.

10. A fishing lure comprising:
an inertially-activated pivotable hook system comprising
a pivotable hook assembly structured and arranged to be pivotable between an un-deployed position and a deployed position, wherein the pivotable hook assembly comprises:
a pendulum mass attached to the lure at a pivot around which the pendulum mass is pivotable; and
at least one hook attached to the pendulum mass; and
a cavity structured and arranged to accommodate the pivotable hook assembly in the un-deployed position,
wherein when in the un-deployed position the pivotable hook assembly is positioned such that the at least one hook is recessed within the cavity, and
when in the deployed position the pivotable hook assembly is positioned such that the at least one hook is exposed outside the cavity,
wherein the pivotable hook assembly is structured and arranged to:
move from the un-deployed position to the deployed position upon the pivotable hook assembly receiving a sufficient inertial force; and
move from the deployed position to the un-deployed position upon a subsiding of the sufficient inertial force, and
wherein the pivotable hook assembly is maintainable in a retracted state by gravity acting on a pendulum mass attached to the hook.

11. The fishing lure of claim 10, wherein the pivotable hook assembly comprises a plurality of hooks.

12. The fishing lure of claim 11, wherein the plurality of hooks comprises two hooks in a hook-behind-hook arrangement.

13. The fishing lure of claim 12, wherein the two hooks in a hook-behind-hook arrangement comprise a frontward hook and a rearward hook, and when the pivotable hook assembly is in a deployed position, the rearward hook is above the frontward hook.

14. The fishing lure of claim 10, wherein the pivotable hook assembly further comprises a connection portion arranged between the pivot and the pendulum mass, and connecting the pivot to the pendulum mass.

15. The fishing lure of claim 14, wherein the connection portion is structured and arranged to provide range of motion and/or balance to the pivotable hook system.

16. The fishing lure of claim 10, wherein the pivotable hook system further comprises a stop pin structured and arranged within the cavity.

17. The fishing lure of claim 16, wherein the stop pin is structured and arranged to restrain a pivoting motion of the pivotable hook assembly upon reaching a fully deployed position.

18. The fishing lure of claim 16, wherein the pendulum mass includes a depression structured and arranged to accommodate the stop pin therein upon the pivotable hook assembly reaching a fully deployed position.

19. The fishing lure of claim 16, wherein the stop pin is a stationary stop pin.

20. The fishing lure of claim 10, wherein the pendulum mass is structured and arranged to maintain the pivotable hook assembly in the un-deployed position until a sufficient inertial force is received by the pivotable hook assembly.

21. The fishing lure of claim 20, wherein upon receiving the sufficient inertial force, the pivotable hook assembly momentarily pivots towards the deployed position to expose the at least one hook outside the lure.

22. A method of using the fishing lure of claim 10, the method comprising:

pulling a line attached to the fishing lure to provide an inertial force to the pivotable hook assembly to move the pivotable hook assembly from an un-deployed position, in which a hook of the pivotable hook assembly is recessed within the fishing lure, to a deployed position, in which the hook of the pivotable hook assembly is exposed outside the fishing lure.

\* \* \* \* \*